(12) United States Patent
Jeong

(10) Patent No.: US 11,289,279 B2
(45) Date of Patent: Mar. 29, 2022

(54) ELECTRIC DOUBLE LAYER CAPACITOR HAVING SEPARATOR-INCLUDING ELECTRODE

(71) Applicant: SF ENERGY TECH CO., LTD, Seoul (KR)

(72) Inventor: Yun Cheol Jeong, Gyeonggi-do (KR)

(73) Assignee: SF ENERGY TECH CO., LTD, Seoul (KR)

( * ) Notice: Subject to any disclaimer, the term of this patent is extended or adjusted under 35 U.S.C. 154(b) by 215 days.

(21) Appl. No.: 16/491,126

(22) PCT Filed: Feb. 27, 2018

(86) PCT No.: PCT/KR2018/002360
§ 371 (c)(1),
(2) Date: Sep. 4, 2019

(87) PCT Pub. No.: WO2018/164406
PCT Pub. Date: Sep. 13, 2018

(65) Prior Publication Data
US 2020/0013562 A1    Jan. 9, 2020

(30) Foreign Application Priority Data

Mar. 4, 2017  (KR) .................. 10-2017-0028003

(51) Int. Cl.
*H01G 11/52* (2013.01)
*H01G 11/26* (2013.01)
*H01G 11/70* (2013.01)

(52) U.S. Cl.
CPC ............. *H01G 11/52* (2013.01); *H01G 11/26* (2013.01); *H01G 11/70* (2013.01)

(58) Field of Classification Search
CPC ........ H01G 11/10; H01G 11/26; H01G 11/52; H01G 11/70; H01G 11/72; H01G 11/82; Y02E 60/13
See application file for complete search history.

(56) References Cited

U.S. PATENT DOCUMENTS 5,949,637 A    9/1999  Iwaida et al.
6,046,903 A    4/2000  Inagawa et al.
(Continued)

FOREIGN PATENT DOCUMENTS

JP    2008-047856 A    2/2008
JP    2012-022792 A    2/2012
(Continued)

OTHER PUBLICATIONS

International Search Report issued in PCT application No. PCT/KR2018/002360, dated Jun. 8, 2018, 17 pp.
(Continued)

*Primary Examiner* — Nathan Milakovich
(74) *Attorney, Agent, or Firm* — Kaplan Breyer Schwarz, LLP

(57) ABSTRACT

An electric double layer capacitor includes a plurality of current collector plates, an electrode layer formed on one surface of each of the current collector plates, and a plurality of separators which extend through the electrode layer from one surface of each of the current collector plates in a continuous pattern of a predetermined design and in which a repeated pattern is formed in the length and width directions of the current collector plates.

12 Claims, 19 Drawing Sheets

(56) References Cited

U.S. PATENT DOCUMENTS

| | | | |
|---|---|---|---|
| 10,916,745 B2* | 2/2021 | Kim | H01M 50/581 |
| 2007/0215926 A1* | 9/2007 | Mitsuda | H01G 11/12 |
| | | | 257/298 |
| 2009/0320253 A1* | 12/2009 | Bourcier | H01G 11/74 |
| | | | 29/25.03 |
| 2010/0053844 A1* | 3/2010 | Eilertsen | H01G 11/26 |
| | | | 361/502 |
| 2014/0106191 A1* | 4/2014 | Itaya | H01G 11/72 |
| | | | 429/82 |

FOREIGN PATENT DOCUMENTS

| | | |
|---|---|---|
| JP | 5163293 B2 | 3/2013 |
| JP | 2018049791 A * | 3/2018 |
| KR | 10-0455318 A | 3/2002 |
| KR | 10-2007-0040954 A | 4/2007 |
| KR | 10-0955233 A | 11/2009 |
| KR | 10-2011-0045092 A | 5/2011 |
| KR | 20180101285 A * | 9/2018 |
| KR | 20180101286 A * | 9/2018 |

OTHER PUBLICATIONS

First Extended European Search Report issued in counterpart European patent application No. 18763948, filed Dec. 2, 2020, 11 pp.
Second Extended European Search Report issued in counterpart European patent application No. 18763948, filed Mar. 26, 2021, 10 pp.

* cited by examiner

[FIG. 1]
PRIOR ART
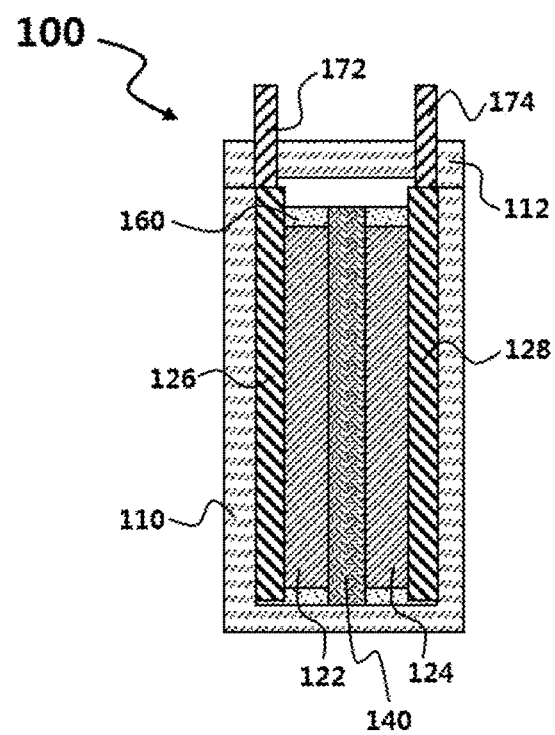

[FIG. 2]
PRIOR ART
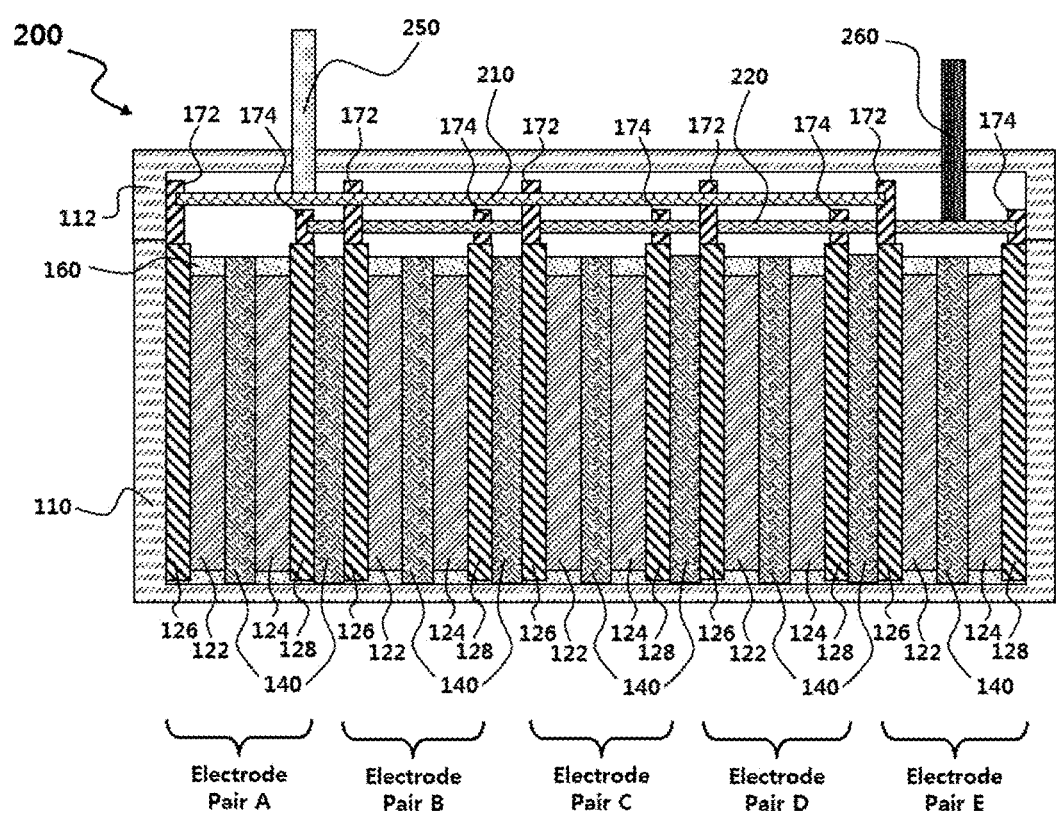

[FIG. 3]
PRIOR ART
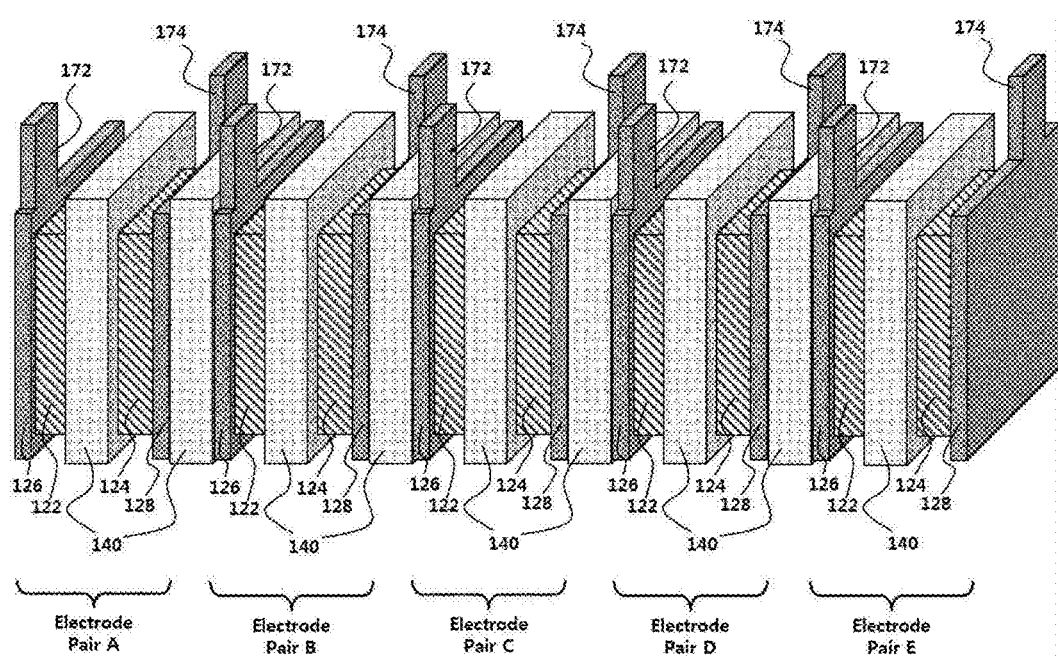

[FIG. 4]
PRIOR ART
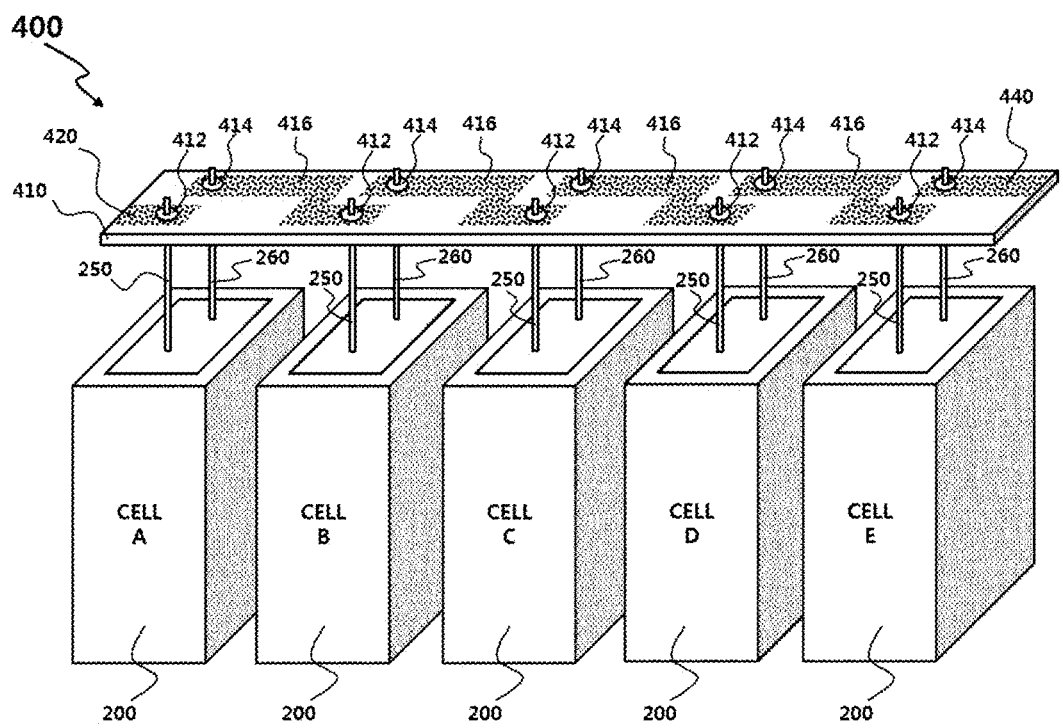

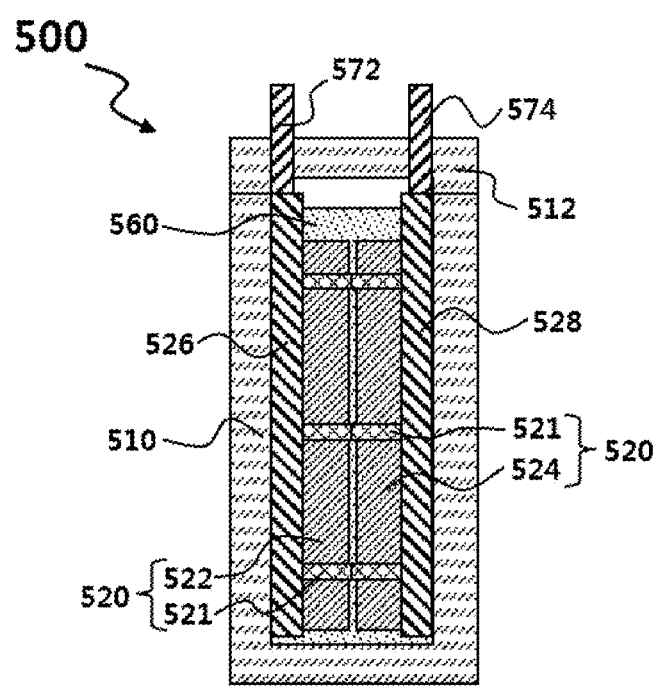
[Fig. 5a]

[Fig. 5b]
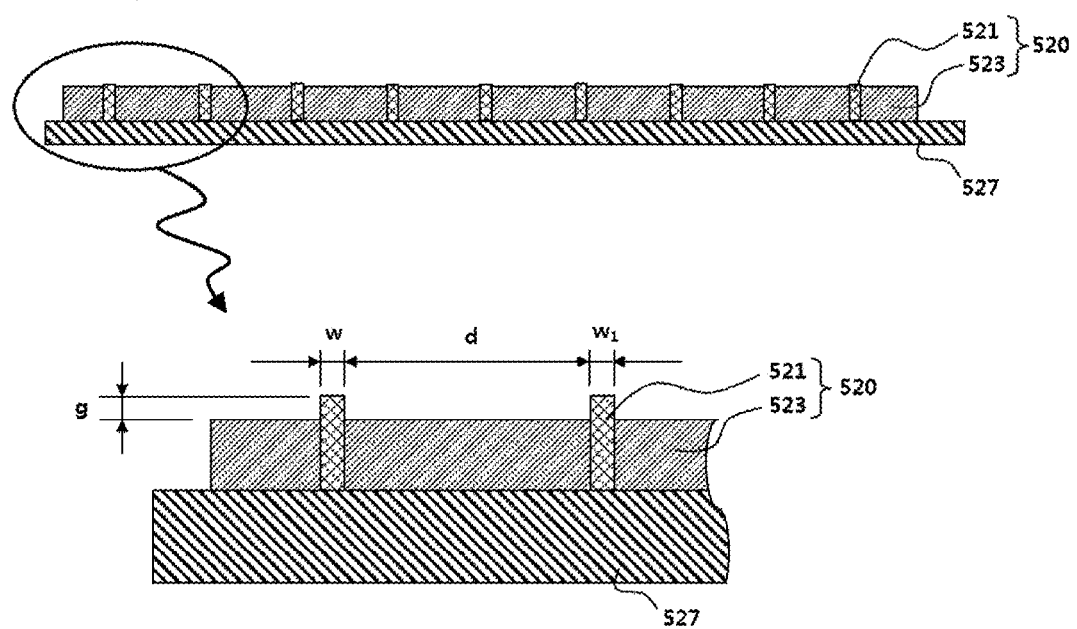

[Fig. 5c]
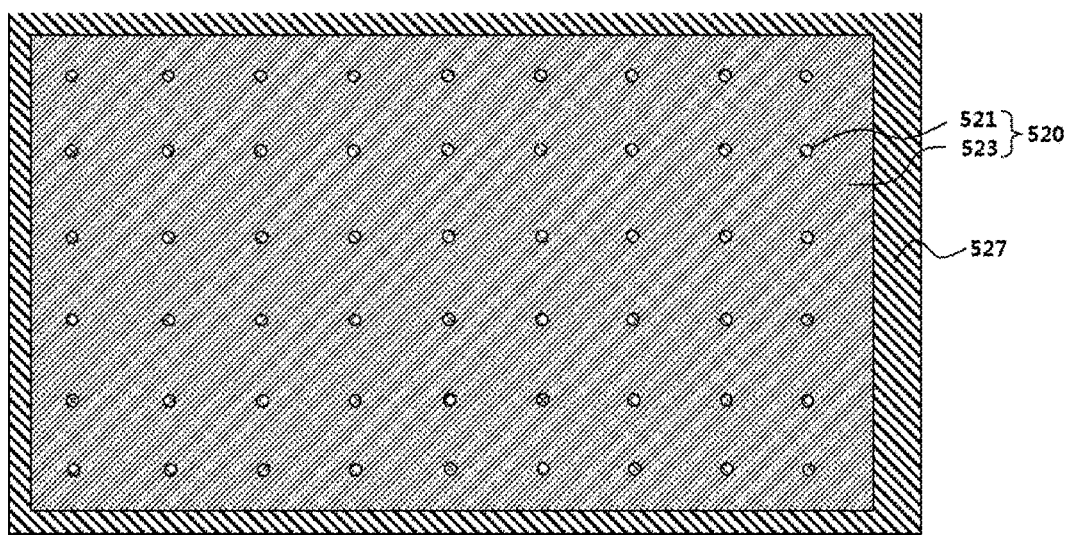

[Fig. 5d]
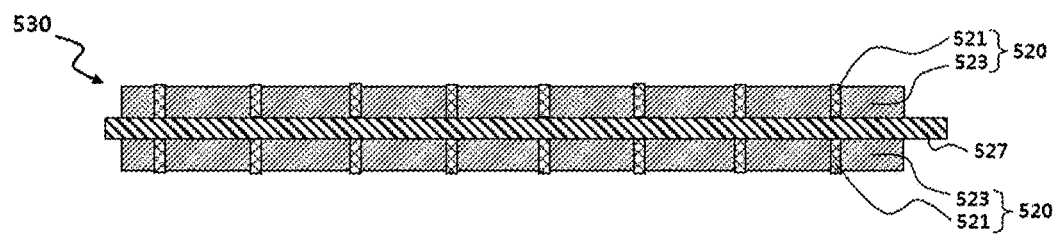

[Fig. 5e]
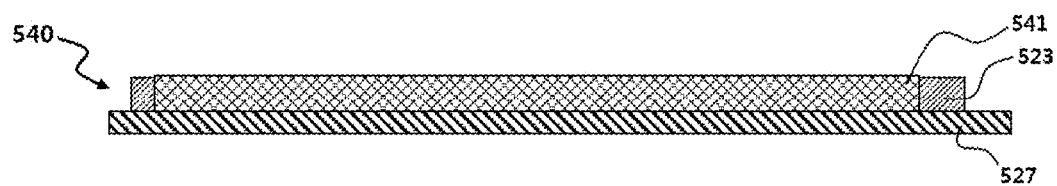

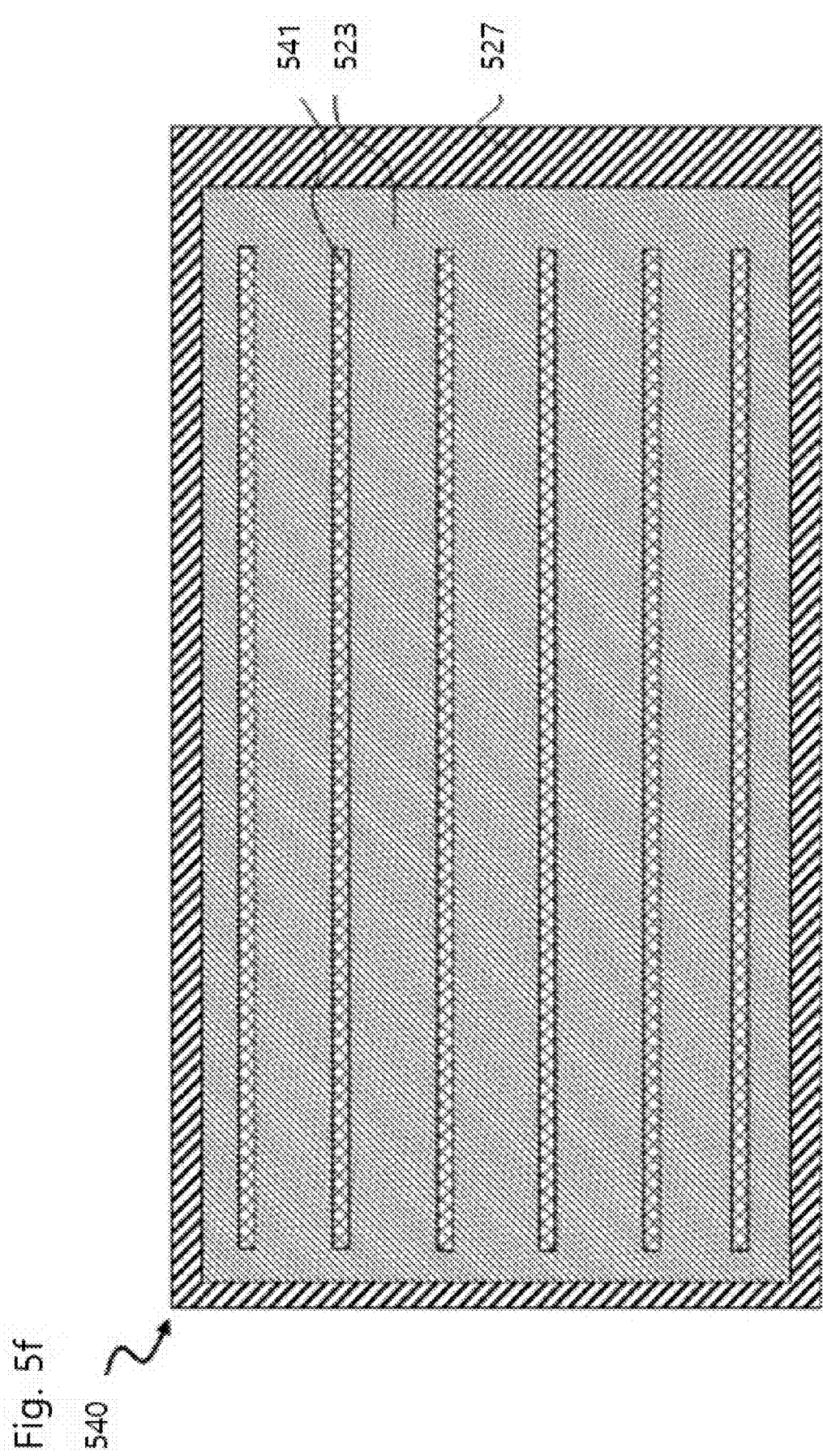

[Fig. 5g]
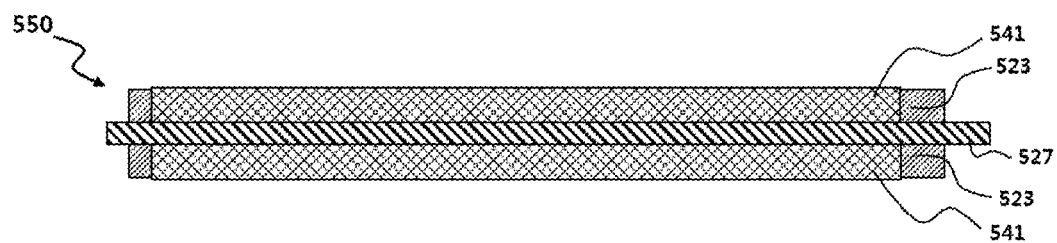

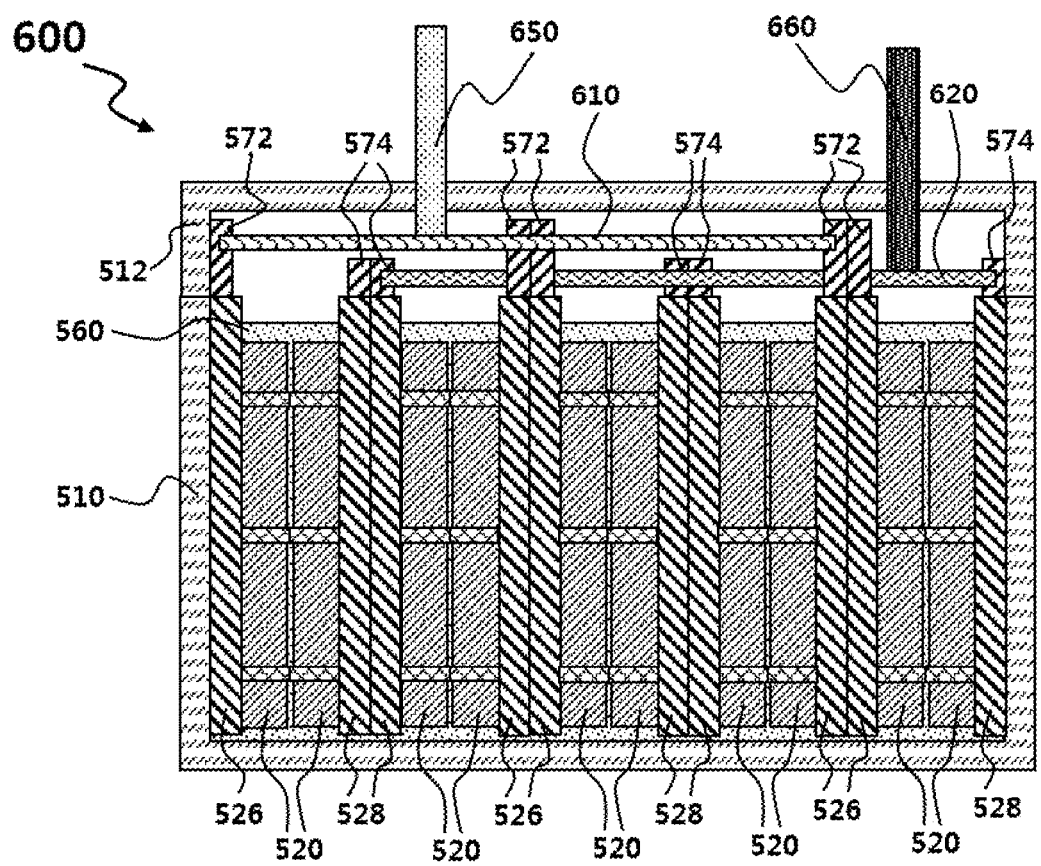
[Fig. 6a]

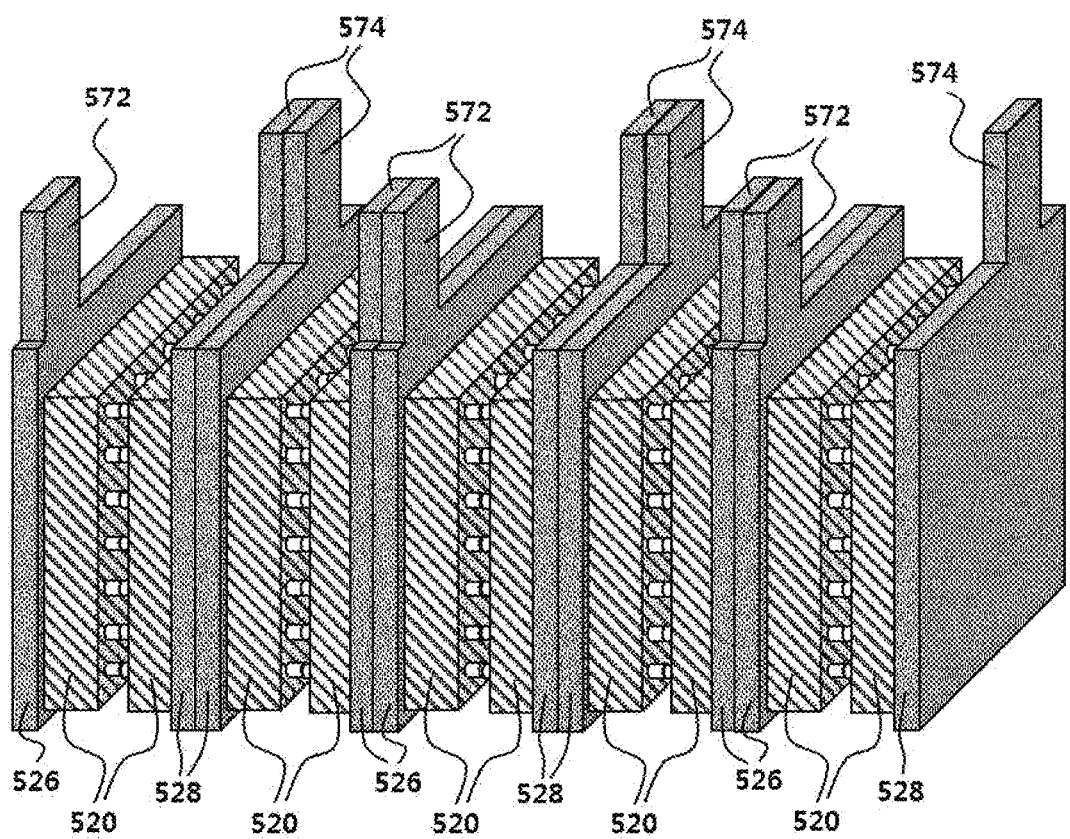
[Fig. 6b]

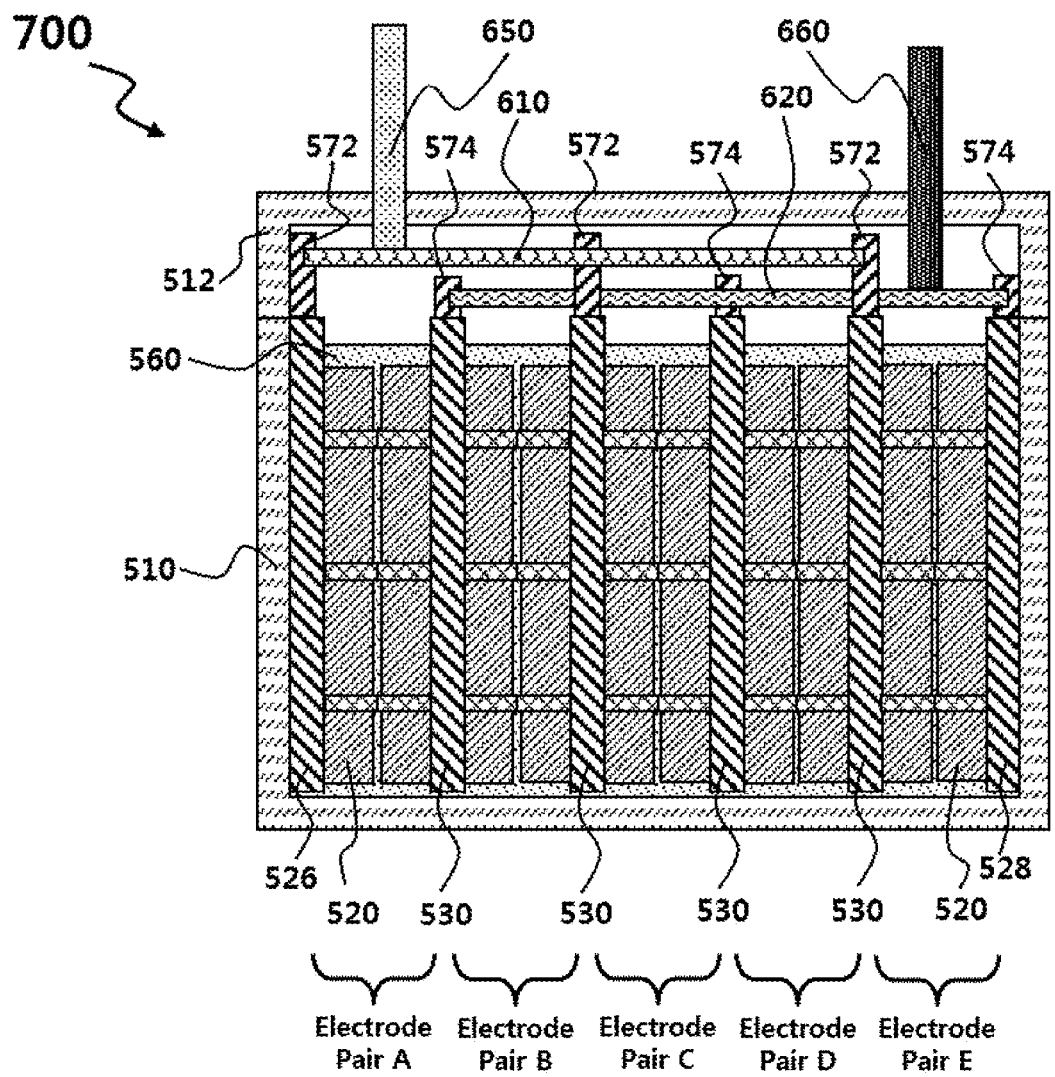
[Fig. 7a]

[Fig. 7b]
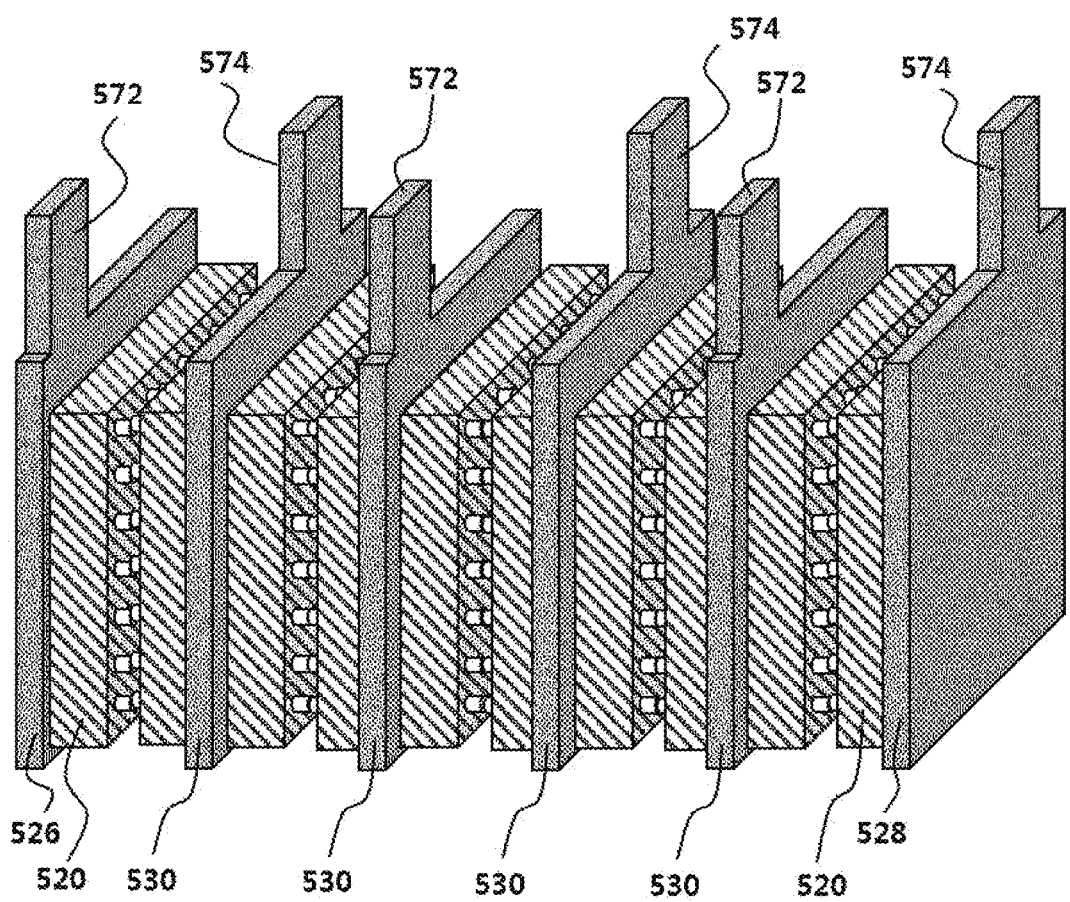

[Fig. 8a]
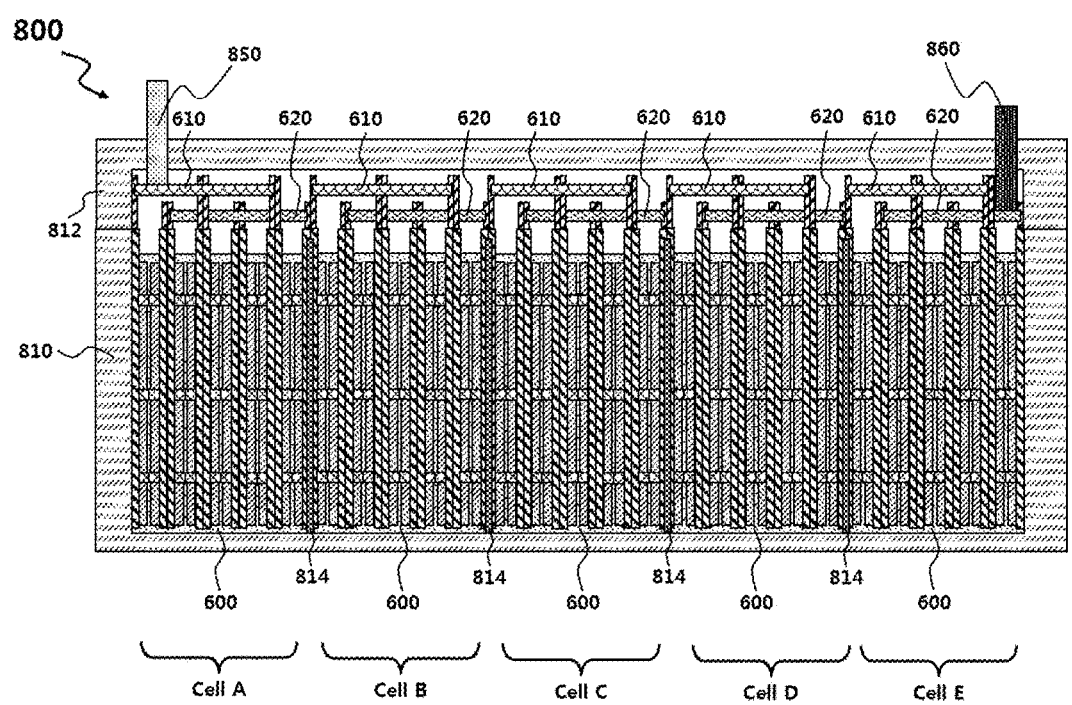

[Fig. 8b]
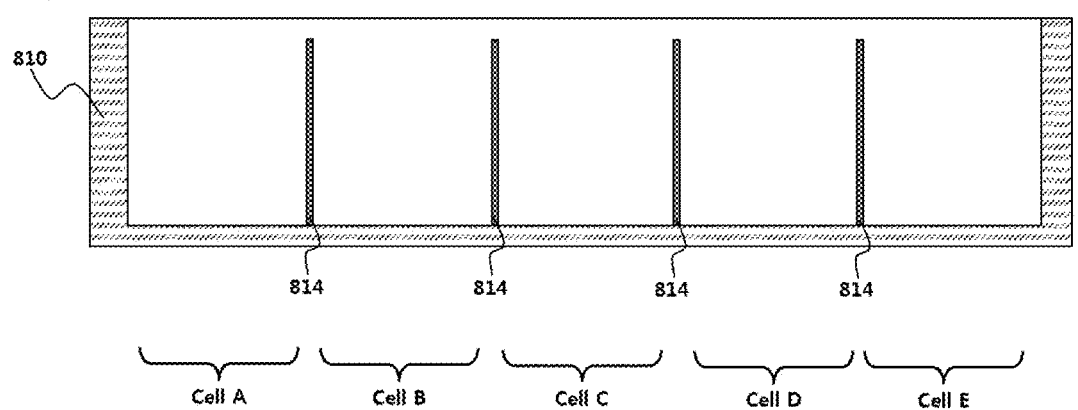

[Fig. 8c]
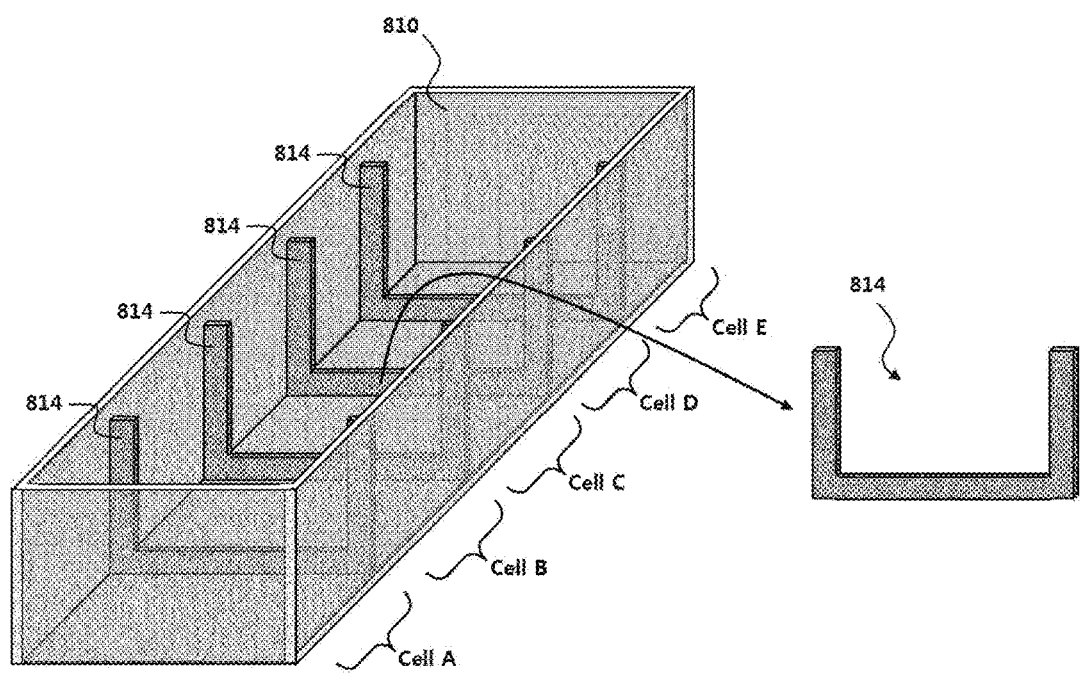

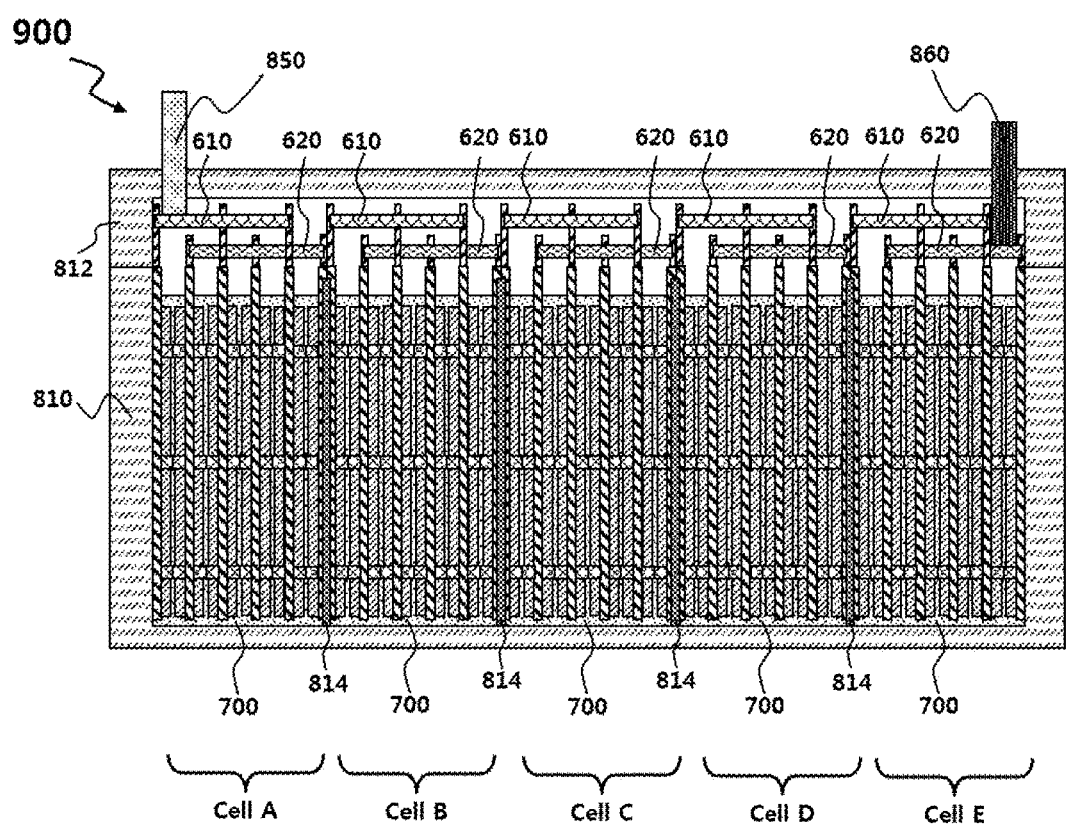
[Fig. 9]

ELECTRIC DOUBLE LAYER CAPACITOR HAVING SEPARATOR-INCLUDING ELECTRODE

TECHNICAL FIELD

The present invention relates to an electrical energy storage device, in particular, to an electric double layer capacitor, and more specifically, to an electric double layer capacitor having a separator-including electrode, which has improved energy storage and output characteristics due to disposing a positive electrode and a negative electrode to be adjacent to and face each other and ionically connecting the positive electrode to the negative electrode without an interface which hinders transport of positive ions and negative ions of an electrolyte to, without a separator, improve conductivity while physically separating the positive electrode from the negative electrode to prevent an electrical contact therebetween in the electric double layer capacitor using a separator-including electrode.

BACKGROUND ART

Generally, an electric double layer capacitor operates as an electric double layer capacitor basic cell in which two conductive current collector plates are disposed such that electrode layers formed thereon face each other, wherein the two electrode layers are formed of activated carbon having a large unit surface area so as to obtain a large electrical energy storage capacity on a conductive substrate which serves a current collector plate in a capacitor container, a porous separator is disposed between the two electrode layers, wherein the porous separator is an insulator that physically separates and insulates the two electrode layers from each other and has a fine porous passage therein, and the capacitor container is filled with an electrolyte to allow dissociated positive and negative ions to be transported through the porous passage to thereby connect the two electrode layers and is sealed with a capacitor container cap.

FIG. 1 is a schematic structural diagram of a conventional electric double layer capacitor basic cell.

As shown in FIG. 1, a conventional electric double layer capacitor basic cell 100 is formed such that a positive current collector plate 126 having one surface on which a positive electrode layer 122 is formed, wherein the positive electrode layer 122 is formed of activated carbon having a large unit surface area, and a negative current collector plate 128 having one surface on which a negative electrode layer 124 is formed, wherein the negative electrode layer 124 is formed of activated carbon in the same manner as in the positive electrode layer 122, are disposed such that the positive electrode layer 122 faces the negative electrode layer 124 in a capacitor container 110, a porous separator 140 is disposed between the positive electrode layer 122 and the negative electrode layer 124 so that the positive electrode layer 122 is separated and electrically insulated from the negative electrode layer 124, the capacitor container 110 is filled with an electrolyte 160 so that dissociated positive and negative ions are transported through a porous passage of the separator 140 to connect the positive electrode layer 122 to the negative electrode layer 124. When the capacitor container 110 is filled with the electrolyte 160, solvent molecules of the electrolyte 160 are adsorbed on interfaces of active electrode surfaces of the positive electrode layer 122 and the negative electrode layer 124, a Helmholtz layer having a solvent molecule thickness of the electrolyte 160 (several angstroms from 0.3 nm to 0.8 nm), in which positive charges of the positive electrode layer 122 and negative ions of the electrolyte 160 are disposed and accumulated to face each other on the positive electrode layer 122 by interposing the absorbed solvent molecules of the electrolyte 160 and negative charges (electrons) of the negative electrode layer 124 and positive ions of the electrolyte 160 are disposed and accumulated to face each other on the negative electrode layer 124, is formed on each interface of the surfaces of the positive electrode layer 122 and the negative electrode layer 124 in a double layer, and a positive electrical lead 172 and a negative electrical lead 174 are respectively connected to the positive current collector plate 126 and the negative current collector plate 128 through a capacitor container cap 112 so as to connect to an external load (not shown) or a charger (not shown). When the charger is connected to both terminals of the positive electrical lead 172 and the negative electrical lead 174 of the conventional electric double layer capacitor basic cell 100 and negative charges (electrons) are applied to the negative electrode layer 124, electric energy is stored and charged through a process in which positive ions, which are randomly distributed on the electrolyte 160 in contact with the Helmholtz layer formed on a surface interface between the negative electrode layer 124 and the electrolyte 160, are transported to a solvent of the electrolyte 160 and the porous passage of the separator 140 so that the positive ions are disposed and accumulated to face each other in proportion to the applied negative charges (electrons) by interposing the Helmholtz layer, and, simultaneously, the positive charges are accumulated on the positive electrode layer 122 in proportion to the electrons accumulated on the negative electrode layer 124, and the negative ions are transported to the Helmholtz layer, which is formed on a surface interface between the positive electrode layer 122 and the electrolyte 160 so that the negative ions are disposed and accumulated to face each other by interposing the Helmholtz layer. When a load is connected, owing to a potential difference of the electrical energy accumulated on the Helmholtz layer of each of the positive electrode layer 122 and the negative electrode layer 124, the negative charges (electrons) accumulated on the negative electrode layer 124 work through the load and combine with the positive charge on the positive electrode layer 122 to be dissipated. Thus, the electric energy is discharged through a process in which the positive ions and the negative ions, which are electrically charged, held, and physically disposed and accumulated on the Helmholtz double layer formed on the surface interfaces of the positive electrode layer 122 and the negative electrode layer 124, are separated from the Helmholtz double layer to be randomly distributed.

However, in the conventional electric double layer capacitor basic cell 100, the separator 140, which is disposed between the positive electrode layer 122 and the negative electrode layer 124 to prevent the positive electrode layer 122 from being in direct contact with the negative electrode layer 124 and allows ions to pass through porous pores, is a layer which has typical porous index standard porosity ranging from 30 to 50% and a thickness ranging from 20 to 50 μm so that the separator 140 is thicker several hundred thousand times than the Helmholtz layer of the solvent molecule thickness (several angstroms from 0.3 nm to 0.8 nm). Thus, the separator 140 allows the transport of the positive ions and negative ions and, simultaneously, acts as resistance to cause degradation in conductivity of the electric double layer capacitor basic cell 100. Further, when the thickness of the separator 140 is increased in order to improve porosity which may cause degradation in insulation characteristic or to increase the ease of manufacturing process, an ion transport distance between the Helmholtz double layers formed in the positive electrode layer 122 and the negative electrode layer 124 increases in proportion to the thickness of the separator 140, and the conductivity of the electric double layer capacitor basic cell 100 is further reduced such that there is a disadvantage due to degradation in energy storage efficiency and an output characteristic of the electric double layer capacitor basic cell 100.

FIGS. 2 and 3 are a schematic structural diagram of the conventional electric double layer capacitor cell and a schematic diagram of an electrode stack.

As shown in FIGS. 2 and 3, in order to increase an electrical energy storage capacity, a conventional electric double layer capacitor cell 200 is formed such that electrode pairs of the electric double layer capacitor basic cell 100 are stacked and the separator 140 is disposed between each of the electrode pairs so that the positive electrical leads 172 and the negative electrical leads 174 of the electrode pairs are connected through a positive connector 210 and a negative connector 220, or the positive electrical lead 172 and the negative electrical lead 174 of each of the electrode pairs are directly connected in parallel. As an electrode area is increased according to a characteristic of a capacitor, a capacitor capacity of the electrode pairs of the electric double layer capacitor basic cell 100 is increased, and the stacked electrode pairs are connected in parallel to increase the electrode area so that an electric energy storage capacity of the electric double layer capacitor cell 200 is increased.

However, there is a disadvantage in that expanding a capacity per area by the separator 140 being disposed between the electrode pairs of the electric double layer capacitor basic cell 100, which is stacked so as to increase the electric energy storage capacity, is limited.

FIG. 4 is a schematic structural diagram of an energy storage device in which a plurality of conventional double layer capacitor cells are connected in series.

As shown in FIG. 4, a conventional energy storage device 400, in which a plurality of electric double layer capacitor cells 200 are connected in series, is classified into an aqueous electrolyte device and an organic electrolyte device according to the electrolyte 160 used in each of the electric double layer capacitor cells 200 which are connected in series. W ten an aqueous electrolyte is used, a cell voltage is in a range of 1 V to 1.5 V. and, when an organic electrolyte is used, a cell voltage is in a range of 2 V to 3 V. Generally, in order to be used in an energy storage device which requires a high voltage, an operating voltage is converted into a high voltage which is suitable for a load by connecting the plurality of electric double layer capacitor cells 200 in series. In order to connect the plurality of electric double layer capacitor cells 200 in series, electric double layer capacitor positive leads 250 and double layer capacitor negative leads 260 are connected using a separated printed circuit board 410 which includes an energy storage pack positive terminal 420, an energy storage pack negative terminal 440, positive electrical lead solder holes 412 and negative electrical lead solder holes 414 to which individual electric double layer capacitor cells are attached, and connection metal plates 416.

In order to increase a voltage, the plurality of electric double layer capacitor cells 200 are connected to the externally provided printed circuit board 410 using the electric double layer capacitor positive leads 250 and the electric double layer capacitor negative leads 260 such that, in addition to internal resistance of each of the electric double layer capacitor cells 200 due to the separator 140, overall connection resistance of the electric double layer capacitor cells 200 is significantly increased due to an increase in contact resistance components of the electric double layer capacitor positive leads 250 and the electric double layer capacitor negative leads 260, connection resistance components of the positive electrical lead solder holes 412 and the negative electrical lead solder hole 414 due to a serial connection using the external printed circuit board 410, and resistance components due to the connection metal plates 416. When a high voltage is used by connecting the electric double layer capacitor cells 200 in series, a deviation in a charging characteristic of the electric double layer capacitor cells 200 may be severe according to an increase in time constant which is proportional to capacitive capacity components between the electric double layer capacitor cells 200 according to a manufacturing process and is proportional to connection resistance which is increased by a serial connection with respect to a characteristic deviation in resistance component. Consequently, a charging deviation phenomenon may be caused in a cell in which charging is completed after a short period of time and a cell in which charging is completed after a long period of time in the energy storage device 400 in which the plurality of electric double layer capacitor cells 200 are connected in series.

When an entirety of cells of the energy storage device 400, in which the plurality of electric double layer capacitor cells 200 are connected in series and to which the charging deviation phenomenon may be caused to be severe, are continuously charged, resistance of electric double layer capacitor cells 200 in which charging is completed in advance is further increased so that a high voltage applied to the positive terminal 420 and the negative terminal 440 of the energy storage device 400, in which the plurality of electric double layer capacitor cells 200 are connected in series, is not uniformly divided and applied to the plurality of electric double layer capacitor cells 200 which are connected in series, and the high voltage is concentrated on the electric double layer capacitor cells 200 of which resistance is increased due to full charging. Thus, dielectric breakdown of the porous separator 140, which is made of polypropylene, polyethylene, or polyamide, may occur in each of the plurality of electric double layer capacitor cells 200 such that there occurs a case in which an operation function of the energy storage device 400, in which the plurality of electric double layer capacitor cells 200 are connected in series, is lost. Consequently, there is a disadvantage in that a balancing circuit should be added to the external printed circuit board 410 so as to correct a characteristic deviation due to an increase in connection resistance with respect to each of the plurality of electric double layer capacitor cells 200. There is a problem in that the added balancing circuit consumes charged electrical energy in the process of correcting the charging deviation between the plurality of electric double layer capacitor cells 200 and delays a charging time such that efficiency, a lifetime, and a characteristic of the energy storage device 400, in which the plurality of electric double layer capacitor cells 200 are connected in series, are additionally degraded due to a function of the balancing circuit.

DISCLOSURE

Technical Problem

The present invention is directed to providing a separator-including electrode so that an electric double layer capacitor basic cell formed of the separator-including electrode is provided without a separator.

The present invention is also directed to providing an electric double layer capacitor cell having a separator-including electrode, in which a plurality of electric double layer capacitor basic cells having separator-including electrodes of electrode pairs are stacked and connected in parallel, formed such that a positive current collector plate with a separator-including electrode formed thereon and a negative current collector plate with a separator-including electrode formed thereon is stacked in an opposite direction to be connected to a negative current collector plate of other electrode pairs stacked with a negative current collector plate of facing electrode pairs and is alternately stacked again adjacent to a positive current collector plate of still other electrode pairs, which is additionally stacked adjacent to the positive current collector plate of the other electrode pairs, in the opposite direction so as to be connected in the same polarity. Consequently, the plurality of electric double layer capacitor basic cells having separator-including electrodes are stacked without a separator for insulation between the electrode pairs, the other electrode pairs, and the still other electrode pairs.

The present invention is also directed to providing an energy storage device formed by connecting a plurality of electric double layer capacitor cells having separator-including electrodes, which is formed such that a front surface of a negative current collector plate provided at a final end of an electric double layer capacitor cell having a separator-including double electrode is connected in series to a front surface of a positive current collector plate provided at a starting end of another electric double layer capacitor cell having a separator-including double electrode which is connected adjacent to the electric double layer capacitor cell, a front surface of a negative current collector plate, which is provided at a final end of the another electric double layer capacitor cell having a separator-including double electrode, is stacked to be connected in series to a front surface of a positive current collector plate provided at a starting end of still another electric double layer capacitor cell having a separator-including double electrode which is connected adjacent to the another electric double layer capacitor cell, and a container having a cell sill, which is provided around an edge of a front contact surface of each of the electric double layer capacitor cells having separator-including double electrodes which are connected in series, is provided such that the electric double layer capacitor cells having separator-including double electrodes are connected in series.

Technical Solution

One aspect of the present invention provides an electric double layer capacitor basic cell having a separator-including electrode, which includes a capacitor container, a positive current collector plate in the capacitor container, a positive electrode layer with a separator, wherein the separator is made of an insulating material, protrudes convexly from one surface of the positive current collector plate in a continuous pattern of a predetermined design, and has a convex shape in which a repeated pattern is formed in length and width directions of the positive current collector plate and of which a height is higher than that of the positive electrode layer, a negative current collector plate, and a negative electrode layer with a separator which is made of an insulating material, protrudes convexly from one surface of a negative current collector plate in a continuous pattern of a predetermined design, and has a convex shape in which a repeated pattern is formed in length and width directions of the negative current collector plate and of which a height is higher than that of the negative electrode layer. The electric double layer capacitor basic cell having a separator-including electrode is formed such that the positive electrode layer and the negative electrode layer are disposed to face each other as electrode pairs, final ends of upper portions of the separators, which are made of an insulating material and provided at a higher level on the positive electrode layer and the negative electrode layer, are formed to be in contact with each other such that the positive electrode layer is physically separated from the negative electrode layer to prevent an electrical contact between the positive electrode layer and the negative electrode layer, and the capacitor container is filled with an electrolyte so that the positive electrode layer and the negative electrode layer are connected in terms of transport of positive ions and negative ions of the electrolyte.

The separators made of an insulating material protrude to a higher level than the electrode layers in a circular or polygonal form. The separators having various sizes and distances therebetween are implemented to protrude to a higher level than the electrode layers by varying the sizes and the distance between the separators for each region.

Another aspect of the present invention provides an electric double layer capacitor cell having a separator-including electrode, in which a plurality of electric double layer capacitor cells having separator-including electrodes of electrode pairs are stacked and connected in parallel, which includes a capacitor container, a positive current collector plate with a separator-including electrode formed thereon and a negative current collector plate with a separator-including electrode formed thereon, which are stacked in an opposite direction to be connected to a negative current collector plate of other electrode pairs stacked with a negative current collector plate of facing electrode pairs in the capacitor container, still other electrode pairs, wherein the still other electrode pairs are alternately stacked again so as to contact a positive current collector plate of the still other electrode pairs, which is stacked adjacent to the positive current collector plate of the other electrode pairs, to the positive current collector plate of the other electrode pairs with the same polarity. The plurality of separator-including electric double layer capacitor basic cells of the electrode pairs according to the present invention may be stacked and disposed, a positive electrode anode lead and a negative electrode lead of each electrode pair may be connected in parallel, and the capacitor container may be filled with an electrolyte.

Still another aspect of the present invention provides an energy storage device, in which a plurality of electric double layer capacitor cells having separator-including electrodes are connected in parallel, including an energy storage device container, a negative current collector plate provided at a final end of an electric double layer capacitor cell having a separator-including double electrode and a positive current collector plate provided at a starting end of another electric double layer capacitor cell having a separator-including double electrode which is connected adjacent to the electric double layer capacitor cell, wherein a front surface of the negative current collector plate and a front surface of the positive current collector plate provided at a starting end of another electric double layer capacitor cell having a separator-including double electrode are stacked to be connected in series in the energy storage device container, a negative current collector plate provided at a final end of the another electric double layer capacitor cell having a separator-including double electrode and a positive current collector plate provided at a starting end of still another electric double layer capacitor cell having a separator-including double electrode which is connected adjacent to the another electric double layer capacitor cell, wherein a front surface of the negative current collector plate and a front surface of the positive current collector plate are stacked to be connected in series, and a cell sill provided around an edge of a front contact surface of each of the separator-including electric double layer capacitor cells which are connected in series in the capacitor container. Therefore, the electric double layer capacitors having separator-including electrode may be divided.

Advantageous Effects

In accordance with an electric double layer capacitor basic cell having a separator-including electrode according to the present invention, final ends of separators, which are made of an insulating material and provided at a higher level than a positive electrode layer and a negative electrode layer which face each other, are in contact with each other to form a gap for physically separating the positive electrode layer from the negative electrode layer such that the positive electrode layer can be prevented from being in electric contact with the negative electrode layer. Therefore, when a step between the separator and the electrode layers is limited to a range of several micrometers or less, the gap between two opposing electrodes can be reduced to several micrometers or less such that transport distances of positive ions and negative ions of an electrolyte can be relatively reduced. Since there is no obstacle between the positive electrode layer and the negative electrode layer which face each other, conductivity can be significantly improved as compared with the conventional electric double layer capacitor basic cell using porous separators, each of which have a thickness of several tens of microns such that there is an effect in that electric energy storage and output performance are excellent. Further, since a porous separator with a difficult manufacturing process is not used, it is possible to reduce durability limitation due to the separator and reduce manufacturing costs.

The electric double layer capacitor cell having a separator-including electrode, in which a plurality of electric double layer capacitor basic cells having separator-including electrodes of electrode pairs are stacked and connected in parallel, is formed such that a negative current collector plate of electrode pairs in a separator-including electric double layer capacitor basic cell is stacked in an opposite direction so as to be connected to a negative current collector plate of other electrode pairs in another separator-including electric double layer capacitor basic cell, and is alternately stacked again in the opposite direction so as to be connected adjacent to a positive current collector plate of still other electrode pairs in still another separator-including electric double layer capacitor basic cell which is additionally stacked adjacent to the positive current collector plate of the other electrode pairs in the another separator-including electric double layer capacitor basic cell. Therefore, when compared with the conventional electric double layer capacitor cells which are stacked using an insulating separator between stacked electrode pairs, the number of electrode pairs stacked per unit area increases such that there is an effect in that electrical energy storage and output performance are improved and an electrical energy storage density is further improved due to conductivity improvement of unit electrode pairs. Further, since a plurality of porous separators required for stacking are not used, there is an effect of reducing durability limitation due to the separator and reducing manufacturing costs.

An energy storage device, which is formed by connecting a plurality of electric double layer capacitor cells having separator-including electrodes, is formed such that a front surface of a negative current collector plate provided at a final end of an electric double layer capacitor cell having a separator-including double electrode is connected to be in direct contact with a front surface of a positive current collector plate provided at a starting end of another electric double layer capacitor cell having a separator-including double electrode which is connected adjacent to the electric double layer capacitor cell, a front surface of a negative current collector plate provided at a final end of the another electric double layer capacitor cell having a separator-including double electrode is stacked to be connected in series to a front surface of a positive current collector plate provided at a starting end of still another electric double layer capacitor cell having a separator-including double electrode which is connected adjacent to the another electric double layer capacitor cell and a cell sill is provided around an edge of a contact surface on which the separator-including electric double layer capacitors are connected in series so that the separator-including electric double layer capacitors are connected in series in the energy storage device container. Therefore, when compared with the conventional energy storage device in which a plurality of electric double layer capacitor cells are connected in series using a separate external printed circuit board, characteristic distortion caused due to an increase in connection resistance resulting from connection of the external circuit board can be remarkably reduced such that the need for a separate correction circuit can be remarkably reduced and durability limitation due to the use of the external printed circuit board can be reduced. Further, there is no need for a separate device for external circuit protection such that there is an effect of reducing manufacturing costs and improving durability.

DESCRIPTION OF DRAWINGS

FIG. 1 is a schematic structural diagram of a conventional electric double layer capacitor basic cell.

FIG. 2 is a schematic structural diagram of a conventional electric double layer capacitor cell.

FIG. 3 is a schematic diagram of an electrode stack of the conventional electric double layer capacitor cell.

FIG. 4 is a schematic diagram of an energy storage device in which a plurality of the conventional electric double layer capacitor cells are connected in series.

FIG. 5A is a schematic structural diagram of a separator-including electrode electric double layer capacitor basic cell according to a first embodiment of the present invention.

FIG. 5B is a side view of a structure of a separator-including electrode according to the first embodiment of the present invention.

FIG. 5C is a plan view of the structure of the separator-including electrode according to the first embodiment of the present invention.

FIG. 5D is a side view of a structure of a separator-including double electrode current collector plate according to a second embodiment of the present invention.

FIG. 5E is a side view of a structure of a vertical stripe separator-including electrode current collector plate according to a third embodiment of the present invention.

FIG. 5F is a plan view of the structure of the vertical stripe separator-including electrode current collector plate according to the third embodiment of the present invention.

FIG. 5G is a side view of a structure of a vertical stripe separator-including dual electrode current collector plate according to a fourth embodiment of the present invention.

FIG. 6A is a schematic structural diagram of a separator-including electrode electric double layer capacitor cell according to a first embodiment of the present invention.

FIG. 6B is a schematic diagram illustrating a stack of electrode pairs of the separator-including electrode electric double layer capacitor cell according to the first embodiment of the present invention.

FIG. 7A is a schematic structural diagram of a separator-including double electrode electric double layer capacitor cell according to the second embodiment of the present invention.

FIG. 7B is a schematic diagram illustrating a stack of electrode pairs of the separator-including double electrode electric double layer capacitor cell according to the second embodiment of the present invention.

FIG. 8A is a schematic structural diagram of an energy storage device in which a plurality of separator-including electrode electric double layer capacitor cells according to the first embodiment of the present invention are connected in series.

FIG. 8B is a schematic internal structural side view of an energy storage device container in which a plurality of separator-including electrode electric double layer capacitor cells of the present invention are connected in series.

FIG. 8C is a schematic diagram of the energy storage device container in which the plurality of separator-including electrode electric double layer capacitor cells of the present invention are connected in series.

FIG. 9 is a schematic structural diagram of an energy storage device in which the plurality of separator-including electrode electric double layer capacitor cells according to the second embodiment of the present invention are connected in series.

MODES OF THE INVENTION

Hereinafter, a separator-including electrode electric double layer capacitor basic cell, a separator-including electrode electric double layer capacitor cell in which electrode pairs of a plurality of separator-including electrode electric double layer capacitor basic cells are stacked and connected in parallel, and an energy storage device in which the plurality of separator-including electrode electric double layer capacitor basic cells are connected in series will be described. Configurations illustrated in the drawings are conceptual diagrams for describing the concept of the present invention, and descriptions of known techniques with respect to the configurations will be omitted.

Embodiments of the present invention are provided to more fully describe the present invention to those skilled in the art. Therefore, shapes and sizes of components in the drawings may be exaggerated or reduced for a more definite description.

First, according to the present invention, an electric double layer capacitor having a separator-including electrode which is formed in a convex shape, in which a pattern protrudes convexly from a current collector plate in a continuous pattern of a predetermined design and is formed in a repeated pattern in length and width directions of the current collector plate, may be implemented in various embodiments. A first embodiment is an example in which a separator-including electrode is formed on one surface of the current collector plate. A second embodiment is an example in which a structure of a separator-including double electrode current collector plate, in which the separator-including electrodes are formed on both surfaces of the current collector plate, is formed. A third embodiment is an example in which a vertical stripe separator-including electrode is formed on one surface of the current collector plate in a stripe pattern which is continuous in the length direction of the current collector plate. A fourth embodiment is an example in which a vertical separator-including double electrode current collector plate, in which an electrode having a vertical stripe separator formed on both surfaces of the current collector plate in a stripe pattern which is continuous in the length direction of the current collector plate, is formed.

FIG. 5A is a structural diagram of a separator-including electrode electric double layer capacitor basic cell according to the first embodiment of the present invention, FIG. 5B is a side view of a structure of the separator-including electrode shown in FIG. 5A, and FIG. 5C is a plan view of the structure of the separator-including electrode shown in FIG. 5A.

Referring to FIG. 5A, an electric double layer capacitor basic cell 500 having a separator-including electrode according to the first embodiment includes a capacitor container 510, a separator-including electrode 520 having a positive electrode layer 522 with a separator 521 in the capacitor container 510, wherein the separator 521 is made of an insulating material, protrudes convexly from one surface of a positive current collector plate 526 in a continuous pattern of a predetermined design, and has a convex shape in which a repeated pattern is formed in length and width directions of the positive current collector plate 526 and of which a height is higher than that of the positive electrode layer 522, and another separator-including electrode 520 having a negative electrode layer 524 with a separator 521 which is made of an insulating material, protrudes convexly from one surface of a negative current collector plate 528 in a continuous pattern of a predetermined design, and has a convex shape in which a repeated pattern is formed in length and width directions of the negative current collector plate 528 and of which a height is higher than that of the negative electrode layer 524 in the same manner as in the positive electrode layer 522. The electric double layer capacitor basic cell 500 having a separator-including electrode is formed such that the separator-including electrode 520 and the another separator-including electrode 520 are disposed to face each other as electrode pairs, final ends of upper portions of the separators 521, which are made of an insulating material and provided at a higher level on the positive electrode layer 522 and the negative electrode layer 524, are in contact with each other such that the positive electrode layer 522 is physically separated from the negative electrode layer 524 and thus a gap is formed to prevent an electrical contact between the positive electrode layer 522 and the negative electrode layer 524, and the capacitor container 510 is filled with an electrolyte 560 so that the positive electrode layer 522 and the negative electrode layer 524 are connected in terms of transport of positive ions and negative ions of the electrolyte 560.

The separator-including electrode 520 of the first embodiment may be manufactured by applying an insulator layer, such as a photoresist, on the positive current collector plate 526 and the negative current collector plate 528, removing a portion except for the design of the predetermined pattern using etching to form an insulator pattern protruding convexly in the predetermined pattern, and forming the positive electrode layer 522 and the negative electrode layer 524 by printing and thermocompression bonding or sintering a paste made of a material such as activated carbon having a large unit surface area, may be manufactured by directly forming the separator 521 in a pattern of a predetermined design protruding convexly from the positive current collector plate 526 and the negative current collector plate 528 through printing and sintering, and forming the positive electrode layer 522 and the negative electrode layer 524 by printing and thermocompression bonding or sintering a paste made of a material such as activated carbon having a large unit surface area, or may be manufactured by printing and drying an electrode paste, which is made of a material such as activated carbon having a large unit surface area, on one surface of each of the positive current collector plate 526 and the negative current collector plate 528, inserting the separator 521, which is separately formed of an insulating material, between the positive electrode layer 522 and the negative electrode layer 524 to temporarily form the separator-including electrode 520, and thermocompression bonding or sintering the positive electrode layer 522 and the negative electrode layer 524 to manufacture the separator-including electrode 520. The separator-including electrode 520 may be manufactured by applying various process techniques.

Referring to FIGS. 5A to 5C, the electric double layer capacitor basic cell 500 having a separator-including electrode according to the first embodiment of the present invention is formed such that the positive electrode layer 522 and the negative electrode layer 524, which have the separators 521 made of an insulating material and having the convex shapes which protrude convexly from the one surfaces of the positive current collector plate 526 and the negative current collector plate 528 in the continuous pattern of the predetermined design and of which heights are higher than those of the positive electrode layer 522 and the negative electrode layer 524, are disposed to face each other as electrode pairs in the capacitor container 510, the final end of the upper portion of the separator 521 formed at a higher level than the positive electrode layer 522 on the positive electrode layer 522 and the separator 521 formed at a higher level than the negative electrode layer 524 on the negative electrode layer 524 are in contact with each other such that the positive electrode layer 522 is physically separated from the negative electrode layer 522 and thus a gap is formed to prevent an electrical contact between the positive electrode layer 522 and the negative electrode layer 524, and the capacitor container 510 is filled with the electrolyte 560 so that the positive electrode layer 522 and the negative electrode layer 524 are connected in terms of transport of ions.

Specifically, the separator 521 is formed on each of the positive current collector plate 526 and the negative current collector plate 528. The separator 521 may be manufactured in a protruding convex shape of a circle or a polygon by applying an insulating layer, such as a photoresist, on the positive current collector plate 526 and the negative current collector plate 528 so as to obtain a continuous protruding pattern on the positive current collector plate 526 and the negative current collector plate 528 and by forming a convexly protruding insulator pattern of a predetermined design by removing the insulating layer except for the predetermined pattern design through etching, may be manufactured by directly forming the separator 521 on each of the positive current collector plate 526 and the negative current collector plate 528 in a convexly protruding pattern of a predetermined design using an insulator material, or may be manufactured by printing and drying an electrode paste made of a material such as activated carbon having a large unit surface area on one surface of each of the positive current collector plate 526 and the negative current collector plate 528, inserting and disposing the separator 521, which is separately formed of an insulating material, between the positive electrode layer 522 and the negative electrode layer 524, and thermocompression bonding or sintering the separator 521. The separator 521 may be formed by applying various process techniques.

As described above, when the separator 521 of the convex shape, which is formed by processing the insulator layer applied on each of the positive current collector plate 526 and the negative current collector plate 528, is repeatedly disposed in a continuous pattern, and the positive electrode layer 522 and the negative electrode layer 524, which are formed at a lower level than the separator 521, are formed by printing and thermocompression bonding or sintering an electrode paste, which is made of a material such as activated carbon having a large unit surface area, on one surface of each of the positive current collector plate 526 and the negative current collector plate 528, wherein the separator 521 is formed on each of the positive current collector plate 526 and the negative current collector plate 528, to be disposed to face each other, the final ends of the separators 521, which are formed to protrude from the positive current collector plate 526 and the negative current collector plate 528 in a circular or polygonal pattern at a higher level than the positive electrode layer 522 and the negative electrode layer 524, are in contact with each other to form a gap between the positive electrode layer 522 and the negative electrode layer 524 such that an insulating purpose may be achieved by spatially separating the positive electrode layer 522 from the negative electrode layer 524, which are formed at a lower level than the separator 521, to prevent an electrical contact therebetween.

A separation distance between the positive electrode layer 522 and the negative electrode layer 524 which are spatially separated by the separators 521 is varied according to several factors such as a width w, a distance d, and a step difference g of the separator 521 of a single unit convex shape which forms a continuously convexly protruding pattern. As the step difference g of the separator 521 of the unit convex shape is increased, the separation distance between the positive electrode layer 522 and the negative electrode layer 524 is increased, whereas, as the step difference g is decreased, the separation distance between the positive electrode layer 522 and the negative electrode layer 524 is decreased. Ion transport conductivities of the positive electrode layer 522 and the negative electrode layer 524, which are connected in terms of transport of positive ions and negative ions of the electrolyte 560, decrease or increase in inverse proportion to the separation distance between the positive electrode layer 522 and the negative electrode layer 524. Further, as the width w of the separator 521 of the unit convex shapes is large and the distance d between the separators 521 is small, an effective facing area between the positive electrode layer 522 and the negative electrode layer 524 is reduced. As the width w of the separator 521 of the unit convex shapes is small and the distance d between the separators 521 is large, the effective facing area therebetween is increased. The ion transport conductivity increases or decreases in proportion to the above description, i.e., the increase and decrease in effective facing area. That is, when an effective facing area between the positive electrode layer 522 and the negative electrode layer 524 is A, conductivity of the electrolyte 560 is σ, and a separation distance between the positive electrode layer 522 and the negative electrode layer 524, which is an average transport distance of the positive ions and the negative ions of the electrolyte 560, is L, electrical conductivity G has the following relational expression. The electrical conductivity G increases or decreases in proportion to the increase and decrease of the effective facing area A and the decrease and increase of the average transport distance of the positive ions and the negative ions, and an output characteristic P of a capacitor cell increases in proportion to the increase of the electrical conductivity G.

$$G = \sigma \frac{A}{L}, P = \frac{1}{4}GV^2$$

In the embodiment of the present invention, in order to improve conductivity due to ion transport of the electric double layer capacitor basic cell 500 having a separator-including electrode, it is preferable that the width w of the separator 521 or the distance d between the separator 521 and the another separator 521 adjacent thereto is formed in a range from 0.01 mm to 1 mm. This is because, when the width w of the separator 521 or the distance d between the separator 521 and the another separator 521 adjacent thereto is less than 0.01 mm, the separators 521 are disposed at a very fine distance and thus the effective facing area between the positive electrode layer 522 and the negative electrode layer 524 is significantly reduced such that an effect of improving conductivity due to the ion transport may be offset, and, when the width w of the separator 521 or the distance d between the separator 521 and the another separator 521 adjacent thereto exceeds 1 mm, a stress distribution effect is reduced at the end of the separator 521 supported on the negative current collector plate 528 such that the separation distance between the positive electrode layer 522 and the negative electrode layer 524 due to the separator 521 may be difficult to maintain.

Further, it is preferable that the step difference g between the separator 521 and each of the positive electrode layer 522 and the negative electrode layer 524 is formed to be less than or equal to 20 μm, wherein the separator 521 is formed to convexly protrude to a higher level than each of the positive electrode layer 522 and the negative electrode layer 524. When the step difference g of the separator 521 is greater than or equal to 20 μm, the separation distance between the positive electrode layer 522 and the negative electrode layer 524, which are separated from each other because the final ends of the separators 521 formed on the positive current collector plate 526 and the negative current collector plate 528 are in contact with each other, is greater than or equal to 40 μm such that an effect of improving conductivity due to the ion transport in the electrolyte 560 may be significantly reduced.

According to the first embodiment of the present invention, when the positive electrode layer 522 and the negative electrode layer 524, each of which has the separator 521 in the convex shape being provided on each of the positive current collector plate 526 and the negative current collector plate 528, protrudes convexly in a continuous pattern of a predetermined design, and has a height that is higher than those of the positive electrode layer 522 and the negative electrode layer 524, are disposed as electrode pairs facing each other, the separators 521 are in contact with each other so that a relatively short physical distance corresponding to two times the step difference g between the separator 521 and each of the positive electrode layer 522 and the negative electrode layer 524 is formed between the positive electrode layer 522 and the negative electrode layer 524 so as to electrically insulate the positive electrode layer 522 from the negative electrode layer 524. Therefore, when compared with the conventional electric double layer capacitor basic cell, the relatively short distance between the positive electrode layer and the negative electrode layer, which are physically separated to be electrically insulated without a separator and connected in terms of transport of the positive ions and the negative ions of the electrolyte filling in the capacitor container, shortens an ion average transport distance, and an obstacle, which blocks the ion transport of the positive electrode layer and negative electrode layer, is not present to improve the conductivity in proportion to the increase in effective facing area. Consequently, efficiency in electrical energy storage and discharge may be improved and durability may be improved beyond durability limitation of the porous separator having relatively low durability.

FIG. 6A is a structural diagram of a double layer capacitor cell having a separator-including electrode electric according to a first embodiment of the present invention, and FIG. 6B is a schematic diagram illustrating a stack of electrode pairs of the double layer capacitor cell having a separator-including electrode electric according to the first embodiment of the present invention.

Referring to FIG. 6A, an electric double layer capacitor basic cell 600 having a separator-including electrode, in which a plurality of electrode pairs of the electric double layer capacitor basic cell having a separator-including electrode according to the first embodiment are stacked and connected in parallel, includes the capacitor container 510, the positive current collector plate 526 having one surface on which the separator-including electrode 520 is formed, and the negative current collector plate 528 having one surface on which the separator-including electrode 520 is formed, wherein the positive current collector plate 526 and the negative current collector plate 528 are disposed such that the separator-including electrodes 520 thereof face each other, other electrode pairs are stacked in an opposite direction so as to be connected to one surface of another negative current collector plate 528 on which the separator-including electrode 520 is stacked and formed adjacent to another surface of the negative current collector plate 528, and still other electrode pairs are alternately stacked again, in an opposite direction, adjacent to another positive current collector plate 5246 on which still other electrode pairs of the separator-including electrode 520 are stacked and formed adjacent to another positive current collector plate 526, on which the other electrode pairs of the separator-including electrode 520 are formed, so as to be contacted in the same polarity. Thus, the positive current collector plate 526 and the positive current collector plate 526, which have the same polarity and the plurality of separator-including electrodes 520 formed thereon, are disposed to be connected to each other, and the negative current collector plate 528 and the negative current collector plate 528, which have the same polarity and the plurality of separator-including electrodes 520 formed thereon, are disposed to be connected to each other. The connected current collector plates are connected using the positive electrical lead 572, the negative electrical lead 574, a positive electrical lead connection line 610, and a negative electrical lead connection line 620, or the positive current collector plate 526 and the negative current collector plate 528, which have the same polarity, are directly connected and disposed to expand an electrode area of the facing electrode pairs which are physically separated to be electrically insulated and connected due to transport of positive ions and negative ions by filling the capacitor container 510 with the electrolyte 560.

Referring to FIGS. 6A and 6B, stacking of the electrode pairs of the electric double layer capacitor basic cell 600 having a separator-including electrode, in which the plurality of electrode pairs of the electric double layer capacitor basic cell having a separator-including electrode according to the first embodiment of the present invention are stacked and connected in parallel, is performed such that the other electrode pairs are stacked in an opposite direction so as to connect the positive current collector plate 526 with the separator-including electrode 520 formed on one surface thereof and the negative current collector plate 528 with the separator-including electrode 520 formed on one surface thereof to the another negative current collector plate 528 with the other electrode pairs of the separator-including electrode 520 formed thereon, wherein the another negative current collector plate 528 is stacked adjacent to the negative current collector plate 528 with the facing electrode pairs of the separator-including electrode 520 formed thereon, and still other electrode pairs are alternately stacked again, in an opposite direction, adjacent to another positive current collector plate 526 on which still other electrode pairs of the separator-including electrode 520 are stacked and formed adjacent to another positive current collector plate 526, on which the other electrode pairs of the separator-including electrode 520 are formed, so that the same polarities are in contact with each other. Thus, the positive current collector plate 526 and the positive current collector plate 526, which have the same polarity and the plurality of separator-including electrodes 520 formed thereon, are disposed to be connected to each other, and the negative current collector plate 528 and the negative current collector plate 528, which have the same polarity and the plurality of separator-including electrodes 520 formed thereon, are disposed to be connected to each other.

The electric double layer capacitor basic cell 600 having a separator-including electrode according to the first embodiment of the present invention includes the capacitor container 510, the positive current collector plate 526 having one surface on which the separator-including electrode 520 is formed, and the negative current collector plate 528 having one surface on which the separator-including electrode 520 is formed, wherein the positive current collector plate 526 and the negative current collector plate 528 are disposed such that the separator-including electrodes 520 thereof face each other. The electric double layer capacitor basic cell 600 is formed such that other electrode pairs are stacked in an opposite direction so as to be connected to one surface of another negative current collector plate 528 on which the separator-including electrode 520 is stacked and formed adjacent to another surface of the negative current collector plate 528, and still other electrode pairs are alternately stacked again, in an opposite direction, adjacent to another positive current collector plate 5246 on which still other electrode pairs of the separator-including electrode 520 are stacked and formed adjacent to another positive current collector plate 526, on which the other electrode pairs of the separator-including electrode 520 are formed so that the same polarities are in contact with each other. Thus, the positive current collector plate 526 and the positive current collector plate 526, which have the same polarity and the plurality of separator-including electrodes 520 formed thereon, are disposed to be connected to each other, and the negative current collector plate 528 and the negative current collector plate 528, which have the same polarity and the plurality of separator-including electrodes 520 formed thereon, are disposed to be connected to each other. The connected current collector plates are connected using the positive electrical lead 572, the negative electrical lead 574, a positive electrical lead connection line 610, and a negative electrical lead connection line 620, or the positive current collector plate 526 and the negative current collector plate 528, which have the same polarity, are directly connected and disposed to expand an electrode area of the facing electrode pairs which are physically separated to be electrically insulated and connected, and the capacitor container 510 is filled with an electrolyte 560 so that the facing electrode pairs are connected in terms of transport of positive ions and negative ions. Consequently, when compared with the conventional electric double layer capacitor cells, the plurality of electrode pairs may be stacked without the separator such that efficiency in electrical energy storage and discharge may be improved and durability may be improved beyond durability limitation of the porous separator.

FIG. 8A is a schematic structural diagram of an energy storage device in which a plurality of electric double layer capacitor cells having separator-including electrodes according to the first embodiment of the present invention are connected in series, FIG. 8B is a schematic internal structural side view of an energy storage device container in which the plurality of electric double layer capacitor cells having separator-including electrodes of the present invention are connected in series, and FIG. 8C is a schematic diagram of the energy storage device container in which the plurality of electric double layer capacitor cells having separator-including electrodes of the present invention are connected in series.

Referring to FIG. 8A, an energy storage device 800, in which the plurality of electric double layer capacitor basic cells 600 having separator-including electrodes are connected in series, according to the first embodiment includes an energy storage device container 810, and the electric double layer capacitor basic cells 600 having separator-including electrodes in the energy storage device container 810, wherein a final end of the electric double layer capacitor basic cell 600 having a separator-including electrode, a starting end of another electric double layer capacitor basic cell 600 having a separator-including electrode which is connected adjacent to a front surface of the negative current collector plate 528, and a front surface of the positive current collector plate 526 are stacked to be connected in series, and a final end of the another electric double layer capacitor basic cell 600 having a separator-including electrode, a starting end of still another electric double layer capacitor basic cell 600 having a separator-including electrode which is connected adjacent to the front surface of the negative current collector plate 528, and the front surface of the positive current collector plate 526 are stacked to be connected in series such that the plurality of electric double layer capacitor basic cells 600 having separator-including electrodes are disposed to be connected in series. A cell sill 814 is formed around an edge of a contact surface on which the front surface of the positive current collector plate 526 and the front surface of the negative current collector plate 528 are connected in series such that the plurality of electric double layer capacitor basic cells 600 having separator-including electrodes are divided to be connected in series.

Referring to FIGS. 8A to 8C, the energy storage device 800, in which the plurality of electric double layer capacitor basic cells 600 having separator-including electrodes are connected in series, according to the first embodiment is formed such that the electric double layer capacitor basic cells 600 having separator-including electrodes in the energy storage device container 810, wherein a final end of the electric double layer capacitor basic cell 600 having a separator-including electrode, a starting end of another electric double layer capacitor basic cell 600 having a separator-including electrode which is connected adjacent to a front surface of the negative current collector plate 528, and a front surface of the positive current collector plate 526 are stacked to be connected in series, a final end of the another electric double layer capacitor basic cell 600 having a separator-including electrode, a starting end of still another electric double layer capacitor basic cell 600 having a separator-including electrode which is connected adjacent to the front surface of the negative current collector plate 528, and the front surface of the positive current collector plate 526 are stacked to be connected in series such that the plurality of electric double layer capacitor basic cells 600 having separator-including electrodes are disposed to be connected in series, and the cell sill 814 is provided around the edge of the contact surface on which the front surface of the positive current collector plate 526 and the front surface of the negative current collector plate 528 are connected in series such that the plurality of electric double layer capacitor basic cells 600 having separator-including electrodes, which are connected in series, are divided to be connected in series.

The above-described energy storage device 800, in which the plurality of electric double layer capacitor basic cells 600 having separator-including electrodes are connected in series, according to the first embodiment is formed as the electric double layer capacitor basic cells 600 having separator-including electrodes in the energy storage device container 810, wherein a final end of the electric double layer capacitor basic cell 600 having a separator-including electrode, a starting end of another electric double layer capacitor basic cell 600 having a separator-including electrode which is connected adjacent to a front surface of the negative current collector plate 528, and a front surface of the positive current collector plate 526 are stacked to be connected in series, a final end of the another electric double layer capacitor basic cell 600 having a separator-including electrode, a starting end of still another electric double layer capacitor basic cell 600 having a separator-including electrode which is connected adjacent to the front surface of the negative current collector plate 528, and the front surface of the positive current collector plate 526 are stacked to be connected in series such that the plurality of electric double layer capacitor basic cells 600 having separator-including electrodes are disposed to be connected in series, and the cell sill 814 is formed around an edge of a contact surface on which the front surface of the positive current collector plate 526 and the front surface of the negative current collector plate 528 are connected in series such that the plurality of electric double layer capacitor basic cells 600 having separator-including electrodes are divided to be connected in series. Therefore, when compared with the energy storage device in which a plurality of electric double layer capacitor cells are connected in series, the plurality of electric double layer capacitor cells having separator-including electrodes may be connected in series in the energy storage device without a separate circuit board. Consequently, there is an advantage in that characteristic distortion due to an increase in contact resistance resulting from a serial connection using an external printed circuit board is significantly reduced such that the need for a correction circuit is significantly reduced, functional durability limitation due to using the external printed circuit board is reduced, and there is no need to use a separate device for the external printed circuit board to reduce manufacturing costs and reduce mechanical durability limitation.

FIG. 5D is a side view of a structure of a separator-including double electrode current collector plate according to a second embodiment of the present invention.

Referring to FIG. 5D, a separator-including double electrode current collector plate 530 according to the second embodiment includes a current collector plate 527, a separator-including electrode 520 provided on both surfaces of the current collector plate 527 and including an electrode layer 523 formed on the both surfaces of the current collector plate 527, and separators 521 made of an insulating material and having a convex shape which protrudes convexly from the both surfaces of the current collector plate 527 in a continuous pattern of a predetermined design and of which a height is higher than that of the electrode layer 523.

FIG. 7A is a schematic structural diagram of a separator-including double electrode electric double layer capacitor cell according to the second embodiment of the present invention, and FIG. 7B is a schematic diagram illustrating a stack of electrode pairs of the separator-including double electrode electric double layer capacitor cell according to the second embodiment of the present invention.

Referring to FIG. 7A, an electric double layer capacitor cell 700 having a separator-including electrode according to the second embodiment includes a capacitor container 510, a positive current collector plate 526 with a separator-including electrode 520 formed on one surface thereof, and the separator-including double electrode current collector plate 530 with the separator-including electrode 520 on both surfaces thereof, wherein the positive current collector plate 526 is disposed to face one surface of the separator-including double electrode current collector plate 530 to form electrode pairs, one surface of another separator-including double electrode current collector plate 530 is stacked to face the other surface of the separator-including double electrode current collector plate 530 to form other electrode pairs, one surface of still another separator-including double electrode current collector plate 530 is stacked to face the other surface of the another separator-including double electrode current collector plate 530 to form still other electrode pairs, thereby stacking the plurality of separator-including double electrode current collector plates 530 to form the plurality of electrode pairs, and the other surface of the lastly stacked separator-including double electrode current collector plate 530 is stacked and disposed to face a negative current collector plate 528 with the separator-including electrode 520 formed on one surface thereof, thereby forming the electrode pairs at a final end of the electric double layer capacitor cell 700. The same polarities of the electrode pairs are directly connected or connected using a positive electrical lead 572, a negative electrical lead 574, a positive electrical lead connection line 610, and a negative electrical lead connection line 620 such that the facing electrode pairs, which are physically separated and electrically insulated, are disposed to be connected in parallel so as to expand an electrode area of the facing electrode pairs and are connected in terms of transport of positive ions and negative ions by filling the capacitor container 510 with an electrolyte 560.

Referring to FIGS. 7A and 7B, electrode stacking of the electric double layer capacitor cell 700 having a separator-including electrode according to the second embodiment is performed such that the positive current collector plate 526 with the separator-including electrode 520 formed on one surface thereof is stacked to face one surface of the separator-including double electrode current collector plate 530 with the separator-including electrode 520 on both surfaces thereof to form electrode pairs, one surface of another separator-including double electrode current collector plate 530 is stacked to face the other surface of the separator-including double electrode current collector plate 530 to form other electrode pairs, one surface of still another separator-including double electrode current collector plate 530 is stacked to face the other surface of the another separator-including double electrode current collector plate 530 to form still other electrode pairs, thereby stacking the plurality of separator-including double electrode current collector plates 530 to form the plurality of electrode pairs, and, the other surface of the lastly stacked separator-including double electrode current collector plate 530 is stacked and disposed to face a negative current collector plate 528 with the separator-including electrode 520 formed on one surface thereof, thereby forming the electrode pairs at a final end of the electric double layer capacitor cell 700.

The electric double layer capacitor cell 700 having a separator-including electrode according to the second embodiment of the present invention includes the capacitor container 510, a positive current collector plate 526 with a separator-including electrode 520 formed on one surface thereof, and the separator-including double electrode current collector plate 530 with the separator-including electrode 520 on both surfaces thereof, wherein the positive current collector plate 526 is disposed to face one surface of the separator-including double electrode current collector plate 530 to form electrode pairs, one surface of another separator-including double electrode current collector plate 530 is stacked to face the other surface of the separator-including double electrode current collector plate 530 to form other electrode pairs, one surface of still another separator-including double electrode current collector plate 530 is stacked to face the other surface of the another separator-including double electrode current collector plate 530 to form still other electrode pairs, thereby stacking the plurality of separator-including double electrode current collector plates 530 to form the plurality of electrode pairs, and the other surface of the lastly stacked separator-including double electrode current collector plate 530 is stacked and disposed to face a negative current collector plate 528 with the separator-including electrode 520 formed on one surface thereof, thereby forming the electrode pairs at a final end of the electric double layer capacitor cell 700. The same polarity of the electrode pairs are directly connected or connected using a positive electrical lead 572, a negative electrical lead 574, a positive electrical lead connection line 610, and a negative electrical lead connection line 620 such that the facing electrode pairs, which are physically separated and electrically insulated, are disposed to be connected in parallel so as to expand an electrode area of the facing electrode pairs and are connected in terms of transport of positive ions and negative ions by filling the capacitor container 510 with an electrolyte 560. Therefore, when compared with the conventional electric double layer capacitor cell, the positive electrode layer and the negative electrode layer of each electrode pair are physically separated and electrically insulated without a separator, and transport distances of positive ions and negative ions between the positive electrode layer and the negative electrode layer, which are connected in terms of transport of the positive ions and the negative ions, are significantly reduced such that conductivity may be improved in proportion to the reduced transport distances. Further, a plurality of electrode pairs may be stacked without the separator, and adjacent electrode pairs being stacked and a single current collector plate may be used as a common current collector plate such that an electrical energy storage density and discharge efficiency may be improved, and durability may be improved beyond durability limitation of the porous separator.

FIG. 9 is a schematic structural diagram of an energy storage device in which the plurality of separator-including electrode electric double layer capacitor cells according to the second embodiment of the present invention are connected in series.

Referring to FIG. 9, an energy storage device 900, in which a plurality of electric double layer capacitor cells 700 having separator-including double electrodes are connected in series, according to the second embodiment includes the energy storage device container 810, electric double layer capacitor cells 700 having separator-including double electrodes in the energy storage device container 810, wherein a front surface of the negative current collector plate 528, which is provided at a final end of the electric double layer capacitor cell 700 having a separator-including double electrode, is stacked to be connected in series to a front surface of the positive current collector plate 526 provided at a starting end of another electric double layer capacitor cell 700 having a separator-including double electrode which is connected adjacent to the electric double layer capacitor cell 700, a front surface of the positive current collector plate 526 provided at a starting end of still another electric double layer capacitor cell 700 having a separator-including double electrode, which is connected adjacent to a front surface of the negative current collector plate 528 provided at a final end of the another electric double layer capacitor cell 700 having a separator-including double electrode, is stacked to be connected in series, the plurality of electric double layer capacitor cells 700 having separator-including double electrodes are disposed to be connected in series, and a cell sill 814 is formed around an edge of a contact surface on which the front surface of the positive current collector plate 526 and the front surface of the negative current collector plate 528 are connected in series such that the plurality of electric double layer capacitor cells 700 having separator-including double electrodes are connected in series.

The above-described energy storage device 900, in which the plurality of electric double layer capacitor cells 700 having separator-including double electrode are connected in series, according to the second embodiment of the present invention is formed such that the front surface of the negative current collector plate 528, which is provided at the final end of the electric double layer capacitor cell 700 having a separator-including double electrode, is stacked in the energy storage device container 810, to be connected in series to the front surface of the positive current collector plate 526 provided at the starting end of another electric double layer capacitor cell 700 having a separator-including double electrode which is connected adjacent to the electric double layer capacitor cell 700, a front surface of the positive current collector plate 526 provided at a starting end of still another electric double layer capacitor cell 700 having a separator-including double electrode, which is connected adjacent to a front surface of the negative current collector plate 528 provided at a final end of the another electric double layer capacitor cell 700 having a separator-including double electrode, is stacked to be connected in series, the plurality of electric double layer capacitor cells 700 having separator-including double electrodes are disposed to be connected in series, and a cell sill 814 is formed around an edge of a contact surface on which the front surface of the positive current collector plate 526 and the front surface of the negative current collector plate 528 are connected in series such that the plurality of electric double layer capacitor cells 700 having separator-including double electrodes are connected in series. Therefore, when compared with the conventional energy storage device in which a plurality of electric double layer capacitor cells are connected in series, the plurality of electric double layer capacitor cells having separator-including electrodes may be connected in series in the energy storage device without a separate circuit board. Consequently, there is an advantage in that characteristic distortion due to an increase in contact resistance resulting from a serial connection is significantly reduced such that the need for a correction circuit is significantly reduced, functional durability limitation due to using an external printed circuit board is reduced, and there is no need to use a separate device for the external printed circuit board such as to reduce manufacturing costs and mechanical durability limitation.

FIG. 5E is a side view of a structure of a vertical stripe separator-including electrode current collector plate according to a third embodiment of the present invention, and FIG. 5F is a plan view of the structure of the vertical stripe separator-including electrode current collector plate according to the third embodiment of the present invention.

Referring to FIGS. 5E to 5F, a vertical stripe separator-including electrode current collector plate 540 according to the third embodiment of the present invention includes a current collector plate 527, an electrode layer 523 formed on one surface of the current collector plate 527, and a vertical stripe separator 541 formed to protrude from one surface of the current collector plate 527 in a rod shape, elongated in a length direction of the current collector plate 527 at a predetermined distance in a width direction thereof, and having a height that is higher than that of the electrode layer 523.

In the electric double layer capacitor basic cell 500 having a separator-including electrode, in the electric double layer capacitor basic cell 600 having a separator-including electrode, and in the energy storage device 800 in which the plurality of electric double layer capacitor basic cells 600 having separator-including electrodes are connected in series, the separator-including electrode 520, the positive current collector plate 526, the separator-including electrode 520, and the negative current collector plate 528 may be replaced with the above-described vertical stripe separator-including electrode current collector plate 540 according to the third embodiment of the present invention.

FIG. 5G is a side view of a structure of a vertical stripe separator-including double electrode current collector plate according to a fourth embodiment of the present invention.

Referring to FIG. 5G, a vertical stripe separator-including electrode current collector plate 550 according to the fourth embodiment of the present invention includes a current collector plate 527, an electrode layer 523 formed on both surfaces of the current collector plate 527, vertical stripe separators 541 formed to protrude from the both surfaces of the current collector plate 527 in a rod shape, elongated in a length direction of the current collector plate 527 at a predetermined distance in a width direction thereof, and having a height that is higher than that of the electrode layer 523. In the electric double layer capacitor cell 700 having a separator-including double electrode and the energy storage device 900 in which the plurality of electric double layer capacitor cells 700 having separator-including double electrodes are connected in series, the separator-including double electrode current collector plate 530 may be replaced with the above-described vertical stripe separator-including double electrode current collector plate 550 according to the fourth embodiment of the present invention.

The invention claimed is:

1. An electric double layer capacitor comprising:
   a current collector plate;
   an electrode layer formed on one surface of the current collector plate, the electrode layer having a first height; and
   a plurality of separators which extend through the electrode layer from one surface of the current collector plate in a continuous pattern of a predetermined design and in which a repeated pattern is formed in the length and width directions of the current collector plate, the separators having a rod shape that is elongated in a length direction of the current collector plate and a second height which is greater than the first height of the electrode layer.

2. The electric double layer capacitor of claim 1, wherein the electrode layer and the separators are formed on both surfaces of the current collector plate.

3. The electric double layer capacitor of claim 1, wherein the separators are formed by:
   applying an insulator layer on the current collector plate and removing a portion except for a pattern design through etching;
   printing and sintering an insulating material in the pattern design on the current collector plate; or
   separately forming the separators using the insulating material, inserting the separators into the electrode layer on the current collector plate and then thermocompression bonding or sintering the electrode layer.

4. The electric double layer capacitor of claim 1, wherein the separators are formed to extend from the current collector plate in a circular or polygonal form.

5. The electric double layer capacitor of claim 1, wherein the separators are formed by varying a width (w) thereof and a distance (d) therebetween.

6. The electric double layer capacitor of claim 5, wherein each of the separators is formed with the width (w) and the distance (d) in a range of 0.01 mm to 1.0 mm.

7. The electric double layer capacitor of claim 1, wherein each of the separators is formed to extend from a surface of the current collector plate with a step difference (g) within 20 μm.

8. An electric double layer capacitor comprising:
   a plurality of current collector plates;
   an electrode layer formed on one surface of each of the current collector plates, the electrode layer having a first height; and
   a plurality of separators which extend through the electrode layer from one surface of each of the current collector plates in a continuous pattern of a predetermined design and in which a repeated pattern is formed in the length and width directions of the current collector plates, the separators having a rod shape that is elongated in a length direction of each of the current collector plates and a second height which is greater than the first height of the electrode layer,
   wherein a pair of the current collector plates are coupled such that a corresponding pair of the electrode layers thereof face each other, and end portions of the plurality of separators are coupled to be in contact with each other so as to form a gap between facing electrode layers such that the pair of electrode layers are physically separated.

9. An electric double layer capacitor comprising:
   a plurality of current collector plates;

an electrode layer formed on one surface of each of the current collector plates, the electrode layer having a first height; and a plurality of separators which extend through the electrode layer from one surface of each of the current collector plates in a continuous pattern of a predetermined design and in which a repeated pattern is formed in the length and width directions of the current collector plates, the separators having a rod shape that is elongated in a length direction of each of the current collector plates and a second height which is greater than the first height of the electrode layer, wherein pairs of the current collector plates are coupled such that corresponding pairs of the electrode layers thereof face each other, and end portions of the plurality of separators are in contact with each other so as to form a gap between facing pairs of the electrode layers such that the facing pairs of electrode layers are physically separated and coupled to form basic cells, and the current collector plates of the basic cells are stacked in a thickness direction so as to be in contact with each other and a plurality of the basic cells are connected in parallel.

10. The electric double layer capacitor of claim 9, wherein:

adjacent ones of the basic cells share a current collector plate of the plurality of the current collector plates; and the electrode layers and the separators of the adjacent ones of the basic cells are formed on both surfaces of the shared current collector plate.

11. An electric double layer capacitor comprising:
a plurality of current collector plates;
an electrode layer formed on one surface of each of the current collector plates, the electrode layer having a first height; and a plurality of separators which extend through the electrode layer from one surface of each of the current collector plates in a continuous pattern of a predetermined design and in which a repeated pattern is formed in the length and width directions of the current collector plates, the separators having a rod shape that is elongated in a length direction of each of the current collector plates and a second height which is greater than the first height of the electrode layer, wherein pairs of the current collector plates are coupled such that corresponding pairs of the electrode layers face each other, and end portions of the plurality of separators are in contact with each other so as to form a gap between pairs of the facing electrode layers such that the facing pairs of electrode layers are physically separated and coupled to form basic cells, the current collector plates of the basic cells are stacked in a thickness direction so as to be in contact with each other such that a plurality of the basic cells are connected in parallel, and one of the current collector plates which is provided at a final end of one of the basic cells is directly connected to a current collector plate which is provided at a starting end of an adjacent one of the basic cells in series.

12. The electric double layer capacitor of claim 11, wherein a cell sill is formed on a connection surface on which a final end of one of the current collector plates is connected to a starting end of another one of the current collector plates.

* * * * *